United States Patent
Suga et al.

(10) Patent No.: US 6,425,673 B1
(45) Date of Patent: Jul. 30, 2002

(54) LIGHT GUIDE PIPE HAVING ELONGATE ROUGHENED PROTRUSIONS AND/OR ROUGHENED CONCAVES, PLANAR LIGHT SOURCE UNIT HAVING A BROAD VIEWING ANGLE CHARACTERISTIC, AND LIQUID CRYSTAL DISPLAY DEVICE

(75) Inventors: Yoshinori Suga; Masanobu Miwa, both of Yokkaichi (JP)

(73) Assignees: Mitsubisshi Chemical Corporation; Yukadenshi Co., Ltd., both of Tokyo (JP)

(*) Notice: Subject to any disclaimer, the term of this patent is extended or adjusted under 35 U.S.C. 154(b) by 0 days.

(21) Appl. No.: 09/665,410

(22) Filed: Sep. 20, 2000

(30) Foreign Application Priority Data

Sep. 20, 1999 (JP) .............................. 11-266320
Sep. 20, 1999 (JP) .............................. 11-266321
Oct. 26, 1999 (JP) .............................. 11-304514

(51) Int. Cl.$^7$ .............................. F21V 8/00; F21V 5/02
(52) U.S. Cl. .................. 362/31; 362/330; 362/339; 362/561; 362/558; 349/65
(58) Field of Search .................. 362/31, 330, 339, 362/561, 558; 349/62, 64–66; 385/146, 901, 129

(56) References Cited

U.S. PATENT DOCUMENTS

| | | | | |
|---|---|---|---|---|
| 5,126,882 A | | 6/1992 | Oe et al. ..................... 359/619 |
| 5,587,816 A | * | 12/1996 | Gunjima et al. .............. 349/62 |
| 5,711,589 A | * | 1/1998 | Oe et al. ....................... 362/31 |
| 5,718,497 A | * | 2/1998 | Yokoyama et al. ........... 362/31 |
| 5,897,184 A | * | 4/1999 | Eichenlaub et al. .......... 349/64 |
| 5,980,054 A | * | 11/1999 | Fukui et al. .................. 362/31 |
| 6,222,689 B1 | * | 4/2001 | Higuchi et al. ............... 362/31 |
| 6,259,854 B1 | * | 7/2001 | Shinji et al. ................. 385/146 |

FOREIGN PATENT DOCUMENTS

| | | |
|---|---|---|
| JP | 61-99187 | 5/1986 |
| JP | 63-62104 | 3/1988 |
| JP | 02-000017 | 1/1990 |
| JP | 02-084618 | 3/1990 |
| JP | 2580451 | 2/1992 |
| JP | 06-018879 | 1/1994 |

* cited by examiner

Primary Examiner—Alan Cariaso
(74) Attorney, Agent, or Firm—Oblon, Spivak, McClelland, Maier & Neustadt, P.C.

(57) ABSTRACT

Light guide pipe. Planar light source unit.

51 Claims, 17 Drawing Sheets

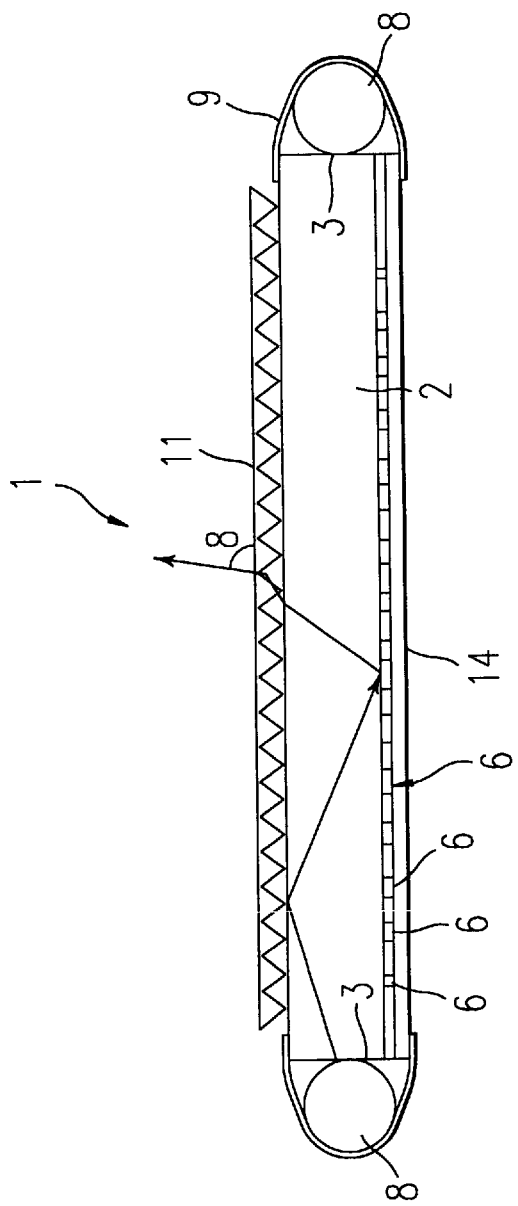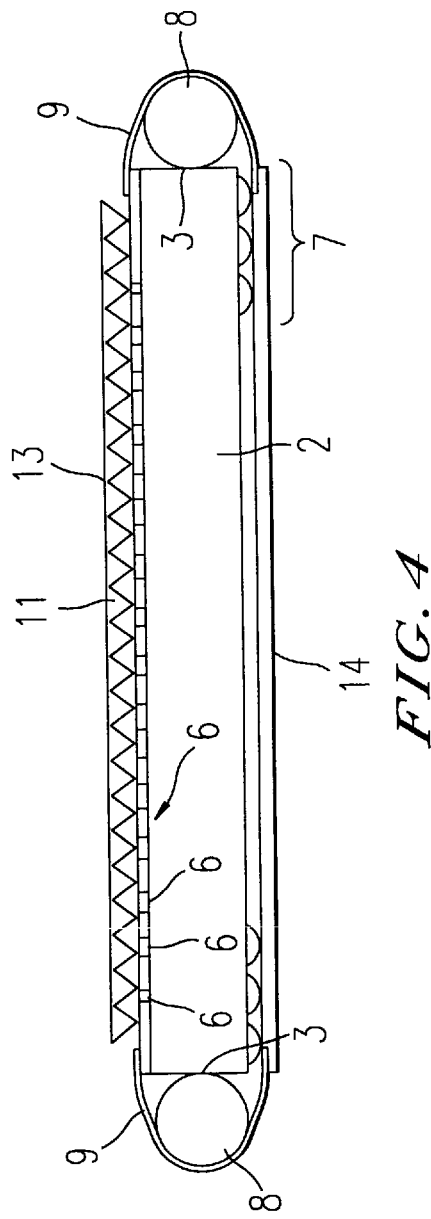

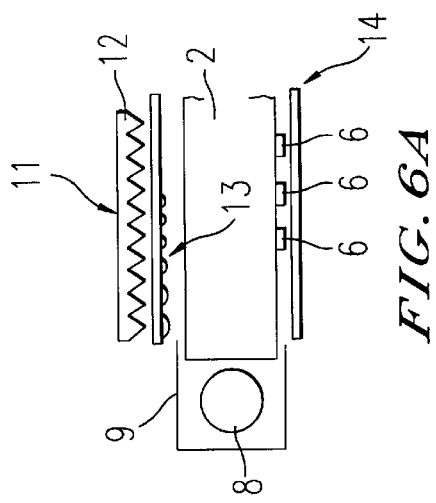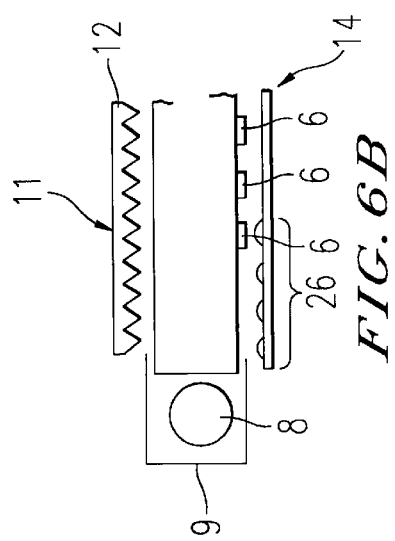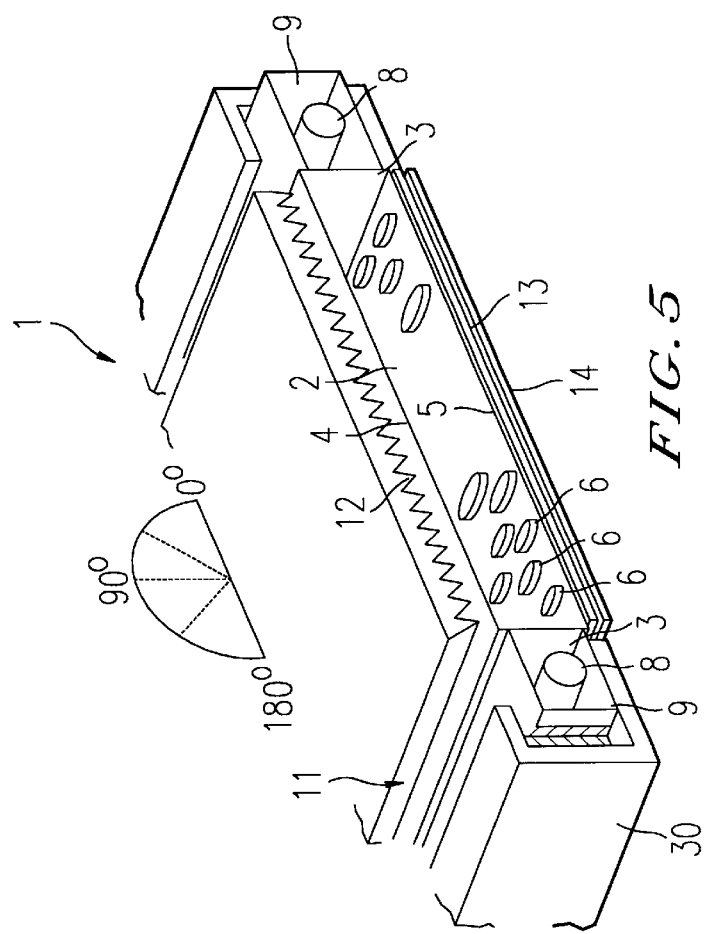

LIGHT GUIDE PIPE HAVING ELONGATE ROUGHENED PROTRUSIONS AND/OR ROUGHENED CONCAVES, PLANAR LIGHT SOURCE UNIT HAVING A BROAD VIEWING ANGLE CHARACTERISTIC, AND LIQUID CRYSTAL DISPLAY DEVICE

BACKGROUND OF THE INVENTION

1. Technical Field of the Invention

This invention relates to a light guide pipe useful for example in a planar light source unit. The invention also relates to a planar light source unit generally, and to a liquid crystal display device.

2. Discussion of the Background

Liquid crystal display devices are broadly used in personal-computer monitors and flat-panel TV displays. A transmissive liquid crystal display device usually has a planar light source unit (backlight) arranged on a backside of the liquid crystal unit. The planar light source unit converts into planar light the light given from a linear light source such as a cold cathode fluorescent lamp or from a light source arranged with a plurality of point light source, such as an LED array.

For example, there are descriptions of planar light source units using a side-light scheme in Japanese Patent Laid-open No. 99187/1986 and Japanese Patent Laid-open No. 62104/1988 which disclose an increase in the density of a light extracting mechanism (light extractor) according to an increase in the distance from light source. The side-light scheme is a scheme having a linear light source provided at a side surface of a transparent light guide pipe of acrylic resin to convert the light from the linear light source into planar light.

Japanese Patent Laid-open No. 17/1990 and Japanese Patent Laid-open No. 84618/1990 describe a planar light source unit comprising a light guide pipe (first element) having a light incident surface, one light emitting surface orthogonal to the light incident surface and a reflecting surface opposed to the light emitting surface and formed with a light extracting mechanism (in this application another name for a light extracting mechanism is light extractor, neither of which are means-plus-function terms), light sources provided at opposite side ends of the light guide pipe, a light control sheet (second element) having a prism array provided in proximity to the light emitting surface of the light guide pipe and having triangular prisms and arranged such that the prisms have a top vertex directed toward the light emitting surface of the light guide pipe where a generating line of an arbitrary prism constituting the prisms is arranged nearly in parallel with the light source, and a reflecting sheet (reflecting surface) is provided in proximity to the light reflecting surface of the light guide pipe. The latter reference (JP Laid-open No. 84618/1990) also discloses a uniform surface-roughening treatment of the light emitting surface of the first element. The inventions described in both publications emit light in a particular direction. These, however, are unsatisfactory with respect to practical optical characteristics, e.g., satisfactory evenness is not achieved in the emission light on the light-emitting surface (see Japanese Patent Laid-open No. 18879/1998). In particular, no existing planar light source device adequately provides a broad view angle suited for a planar light source unit used as a liquid crystal display for monitors or thin panel televisions.

Japanese Patent Laid-open No. 18879/1994 describes a planar light source unit comprising a light guide pipe having a light incident surface, one light emitting surface orthogonal to the light incident surface and a light reflecting surface opposed to the light emitting surface and formed with a light extracting mechanism, the light guide pipe having a roughened surface having a directivity emission function or a plurality of lens units provided in one or both of the light guide pipe light emitting surface and reflecting surface, a smooth area formed in a surface having the roughened surface or the lens units so that the ratio of the smooth area increases as the light emitting surface is approached thereby having a control function to make the luminance value of the light emitted from the light emitting planar light sources provided at opposite side ends of the light guide pipe even, a light control sheet provided in proximity to the light emitting surface of the light guide pipe and having a prism array comprising triangular prisms so that the triangular prisms have a top vertex directed toward the light emitting surface of the light guide pipe and a generating line of an arbitrary prism constituting the prism array arranged nearly in parallel with the light source, a reflecting sheet provided in proximity to the reflecting surface of the light guide pipe. According to this invention, front brightness is nearly sufficiently achieved. However, the view angle characteristic is extremely narrow in a direction perpendicular to a major axis of the light source and hence not well suited in application to a liquid crystal display device or the like. Even with this reference, it is still difficult to provide brightness evenly throughout the entire light guide pipe surface in attempting to solve the problem of the existing dark region in a light guide pipe surface, as shown in FIG. 13 and FIG. 14 herein. (The reason a dark region 22 exists is explained below based on FIG. 14.) A fluorescent lamp, such as a cold cathode fluorescent lamp, has a light emission characteristic similar to a light emission angular distribution as seen in so-called Lambert type scattering with high light emission without variation in each of the light emission angles. Consideration is made on the light emitted from a linear light source taking into account such a light distribution characteristic. In FIG. 14 the light emitted, e.g. from a major portion of each linear light source propagates up to a center region in a light emitting surface of a light guide pipe. That is, most of the linear light source contributes to light emission through the center region. On the other hand, in the dark region 22 of the light-emitting surface (FIG. 14), there is no effective reach of the light from the part of the light sources positioned far from the dark region (e.g. emission light 34c in the dark region 37. Due to this, the amount of light reaching the part corresponding to the dark regions 31, 32 of the light-reflecting surface is insufficient.

Meanwhile, the light rays propagating into the light guide pipe at a middle area of two light sources (FIG. 14) or its vicinity has directivity distributed nearly symmetric left and right as represented by optical vectors of emitting light as viewed from above the light emitting surface. However, the directivity of the light ray in respective areas near the light sources distributes asymmetric left and right as represented by optical vectors of emitting light.

A light guide pipe using a conventional light extracting mechanism (extractor), which means a print-type light guide pipe made by a normal screen printing process using light scattering ink, such as resins composed of $TiO_2$ or $SiO_2$ microparticles, has directivity varying so much because of the multi-scattering process with microparticles, thus, this asymmetric directivity caused no problems. However, a light guide pipe which has surface-roughened protrusions as the light extracting mechanism has directivity which does not vary so much when light diffuses-reflects through the light extracting mechanism. Asymmetric left and right directivity distribution as represented by the optical vectors of emitting light is maintained as it is, and light emits from the light guide pipe. Due to this, at the side area of the light guide pipe, in the vicinity of the light sources, the brightness of light is insufficient in the most-necessary forward direction.

A conventional planar light source unit is also set to have a maximum brightness in a normal line direction from the light emitting surface. A two-lamp type planar light source unit is set to provide a maximum brightness in a normal line direction of the light-emitting surface for light from each of the light sources. The view angle characteristic in this case is as shown in FIG. 23. That is, in FIG. 23, the dotted lines represent a brightness distribution for each one light source, while solid line is a combination of light from the two light sources. As understood from FIG. 23, the conventional planar light source unit has a maximum brightness at a view angle of nearly 90 degrees for a combination of emission light from the two light sources. However, when used in a large-sized liquid crystal display, desirable optical characteristics are not available due to flickering or the like on the screen.

In the conventional art, there is a problem that it is impossible to obtain an illuminating optical system having an even brightness characteristic over the entire light guide pipe surface, i.e. a dark region exists in the light guide pipe surface and a bright line might occur in the vicinity of the light incident surface of the light guide pipe, especially in a light guide pipe which has surface-roughened protrusions as a light extracting mechanism (light extractor).

In conventional illuminating optical systems, there is also a problem in that a viewing angle characteristic cannot be kept sufficiently broad when the optical system uses a prism array sheet comprising triangular prisms and the triangular prisms have a top vertex directed toward the light emitting surface of the light guide pipe.

Also in the conventional planar light source unit, there is another problem in that it is difficult to obtain a planar light source which is simple in structure and easy to manufacture.

JP U5-69782, incorporated herein by reference, discloses a system of roughened protrusions and/or concaves limited in shape to circles, squares and ellipses. This reference does not disclose protrusions or concaves all having their long axis oriented in a common way. In this sense, the present invention can utilize the technology, elements, etc. of this reference while improving performance by orienting the long axis of the protrusions and/or concaves.

SUMMARY OF THE INVENTION

It is one object of the present invention to provide a planar light source unit solving at least one of the above-mentioned problems and a liquid crystal display device using such a planar light source unit(see FIG. 1).

Accordingly, a first embodiment or form of the present invention is a light guide pipe both by itself, and contained within a planar light source unit. Briefly, the planar light source unit comprises: the invention light guide pipe 2 having a light incident surface 3, one light emitting surface 4 orthogonal to the light incident surface 3, a reflecting surface 5 opposed to the light emitting surface, and a light extracting mechanism (light extractor) 7 formed on at least one of the light emitting surface and the reflecting surface;

Linear light sources 8 arranged at opposite side ends of the light guide pipe; a light control sheet 11 provided in proximity to the light emitting surface of the light guide pipe and having a prism array 12 optionally comprising triangular prisms such that the triangular prisms have a top vertex directed toward the light emitting surface of the light guide pipe and an arbitrary prism constituting a line of the triangular prisms, vertices of the prism array has a generating line positioned generally (5 micrometer to 200 micrometer, more preferably 10 micrometer to 150 micrometer, the most preferably 20 micrometer to 100 micrometer) in parallel with the light incident surface (see, e.g., FIG. 1 where the prism vertices form lines in parallel with the light incident surface); and a reflecting sheet 14 provided close to the reflecting surface of the light guide pipe, namely the distance between a reflecting sheet and the light guide pipe are within 500 micrometer, more preferably 400 micrometer, the most preferably 250 micrometers (including in contact with); wherein the light extractor comprises a plurality of surface-roughened protrusions and/or concaves provided on at least one surface of the light guide pipe and the surface-roughened protrusions and/or concaves all have a major axis in a direction nearly perpendicular to the long axis of the linear light source. For example, the major axis has the angle 60 to 120 degree, more preferably 70 to 110 degree, the most preferably 80 to 100 degree to the long axis of linear light source. With this planar light source unit it is possible to effectively extract the light from the light source and increase the brightness for the entire planar light source unit. (For the light guide pipe itself, it is preferable that the protrusions and/or concaves all have their individual major axis within 30 degrees of all others and used not be specially oriented with regard to an external reference. However, precise specification for desirable orientation for these light extractors are defined by the parameter of effective aspect ratio described below.

A second form of the invention is a planar light source unit where a scatter enhancing region is provided in at least one side triangular portion of the reflecting surface and/or the light emitting surface of the light guide pipe, said triangular portion having as a base a different side of said light guide pipe from those opposite ends provided with the light sources, the scatter enhancing region having a higher density of surface-roughened protrusions and/or concaves as compared to other portions of the reflecting surface and light emitting surface at the same distance from the light source. In conventional planar light source units, there exists a dark region as stated before. The provision of a scatter enhancing region having a higher relative density of protrusions and/or concaves in region corresponding to this dark region makes it possible to effectively introduce light to the dark region and hence provide even brightness in the planar light source unit.

A third form of the invention is a planar light source unit, comprising: a light guide pipe 2 having a light incident surface 3, one light emitting surface orthogonal to the light incident surface, a reflecting surface 5 opposed to the light emitting surface and a light extracting mechanism (light extractor) 7 formed on at least one of the light emitting surface and the reflecting surface; two light sources arranged at opposite side ends of the light guide pipe; a light control sheet provided in proximity to the light emitting surface of the light guide pipe, for example, a light control sheet exists within 500 micrometer, more preferably 400 micrometer, the most preferably 250 micrometer to the light guide pipe (including in contact with), and a reflecting sheet provided close to the reflecting surface of the light guide pipe, for example, the reflecting sheet exists within 500 micrometer, more preferably 400 micrometer, the most preferably 250 micrometer to the light guide pipe (including contact);

arranged such that when any one of the light sources is put on, a vertical (i.e. orthogonal to the light incident surface) view angle distribution characteristic of an emission light ray observed immediately above the light control sheet in a normal line direction of the light emitting surface is such that when represented on a diagram having luminance [cd/m²] taken on a vertical axis and an emitting angle [degrees] of an emission light ray on a horizontal axis, a line representing a vertical view angle distribution characteristic of an emission light ray in a normal direction of the light emitting surface has steep and slant regions, in other words, above mentioned curve usually has mountain shape, and the steep region means the one side of that curve with a peak as a boundary that have smaller half height width at half luminance intensity from peak luminance intensity. And the slant region means another side of that curve. with a peak as a boundary; and where the two light sources are put on, lines representing view angle distribution characteristics given respectively by said light sources intersect at their slant regions.

In the case of combining the light as represented in FIG. 21, where the lines representing view angle distribution characteristics given respectively by the light sources intersect at their steep region, a combined distribution of emission light assumes a two-mountain-formed distribution. This is not necessarily preferred. The absolute and relative slopes of the curves (lines) in the Figures provide preferred steep and slant regions.

BRIEF DESCRIPTION OF THE DRAWINGS

FIG. 3 is a longitudinal sectional view schematically showing the planar light source unit according to a first embodiment of the invention;

FIG. 4 is a longitudinal sectional view schematically showing the planar light source unit according to a second embodiment of the invention;

FIG. 5 is a fragmentary perspective view showing the planar light source unit according to a first embodiment of the invention;

FIG. 6 is a fragmentary sectional view schematically showing a major part around the light source of the planar light source unit shown in FIG. 5;

DETAILED DESCRIPTION OF THE PREFERRED EMBODIMENTS

The invention light guide pipe useful for example in planar light source units, a planar light source unit, and a liquid crystal display will now be explained with reference to the drawings.

Figure 1:
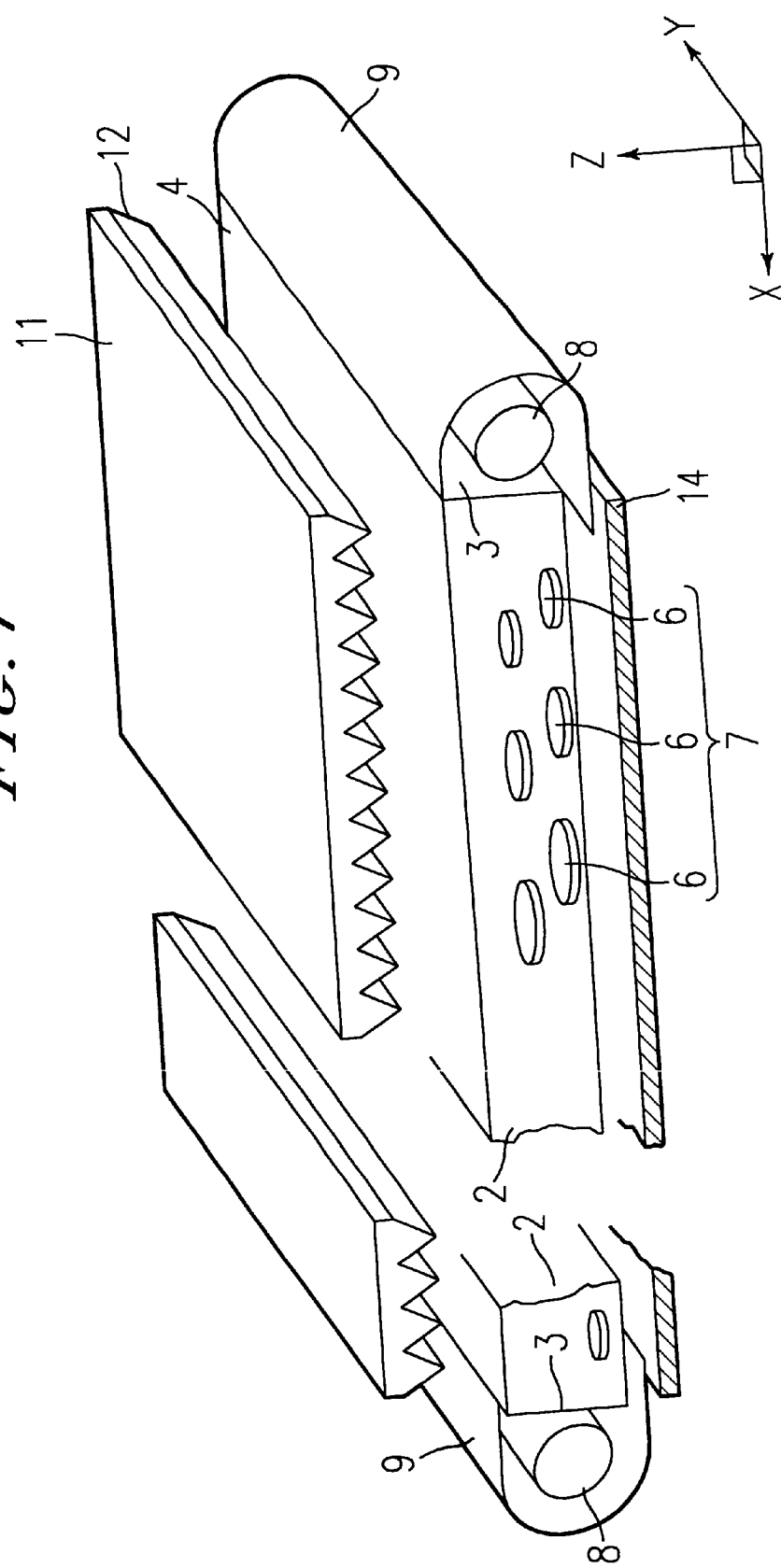
FIG. 1 is a perspective view schematically showing a planar light source unit according to a first embodiment of the present invention.

FIG. 1 depicts a planar light source unit according to one embodiment of the invention. In FIG. 1, element 1 is a planar light source unit, element 2 is a light guide pipe, element 3 is a light incident surface of a light guide pipe, element 4 is a light emitting surface of a light guide pipe, element 5 is a light reflecting surface, element 6 is surface-roughened protrusions (net dots), element 7 is a light extractor, element 8 is a light source, and element 9 is a reflector. This planar light source unit is provided with a light guide pipe, light sources provided at opposite side ends of the light guide pipe, a light control sheet and a reflecting sheet.

Light sources useful herein include a linear light source having point light sources, such as LEDs or incandescent lamps, arranged in a line, or a linear light source such as a fluorescent lamp. Among these, a fluorescent lamp or the like is preferred. Of the linear light sources, a cold cathode fluorescent lamp is especially preferred in view of light emission efficiency, etc. The light source is preferably arranged at side ends of the light guide pipe. It is especially preferred to provide two light sources at opposite side ends of the light guide pipe, for the reasons shown in FIG. 14. Thus, the light source of the invention includes so-called two-lamp type light sources having one, e.g., cold cathode fluorescent lamp provided at each of the opposite side ends of the light guide pipe, and the so-called four-lamp type light source having two, e.g., cold cathode fluorescent lamps provided at each of the opposite side ends of the light guide pipe.

Reflectors 9 are preferably respectively arranged around the light sources. The light source emits light including one portion to be incident directly on the light guide pipe without impinging on the reflector. The portion of light which does not travel directly to the light guide pipe is reflected upon the reflector, then being incident on the light guide pipe (preferably on a light incident surface thereof).

The material for the reflector is not limited. Preferably, optical reflectivity is high. The reflector can use, for example, a metal sheet evaporated with silver or a molded white plastic. The thickness of the metal sheet is preferably 0.1–1 mm, more preferably 0.05–0.4 mm, and most preferably 0.2–0.4 mm.

The reflector is preferably arranged such that stresses are caused to press or hold the reflector onto the side end of the light guide pipe.

The reflector is preferably fixed with close contact to the light guide pipe, for example in contact with the pipe, due to the following reason. That is, if a gap exists between the reflector and the light guide pipe, the light from the light source leaks through the gap to the outside of the planar light source unit, thus making it difficult to provide the planar light source unit with even brightness.

Various forms are to be considered as close-contact fixing means. These include, for example, a frame made preferably of plastic to accommodate the planar light source unit having a guiding groove through which the reflector 9 is fixed in position by fitting its end with the guide groove, as shown in FIG. 5. See element 30. This fixes the light guide pipe and the reflector into a correct relationship, thus effectively preventing or significantly reducing the occurrence of bright lines.

Also, another close-contact fixing means is a member excellent in deformability or an elastic member provided on a side of the reflector or the frame 30. The member with excellent deformability includes cellular urethane, etc. The elastic member includes a leaf spring mechanism, etc. Due to this, because the reflector undergoes stresses to be pressed toward the light guide pipe from the frame accommodating the planar light source unit, the reflector is stabilized in position thus making it possible to effectively prevent or significantly reduce a gap from being formed between the reflector and the light guide pipe. As a result, bright lines are effectively prevented from occurring.

The light guide pipe of the invention has one or more light incident surfaces to receive incident light from one or more light sources, one light emitting surface positioned perpendicular to the light incident surface, a reflection surface positioned opposed to the light emitting surface and a light extracting mechanism (light extractor) formed on at least one of the light emitting surface and the reflecting surface.

The light guide pipe can be formed of materials such as a resin material and glass and is preferably formed of a resin material. Examples include acrylic resin, methacrylic resin, polycarbonate resin, polyester resin or cyclic olefin resin. Among these, acrylic resin and methacrylic resin are especially preferred because they provide favorable transparency and a hard surface to a light guide pipe and are resistive to marring.

The forming method of the light guide pipe is not especially limited. That is, it is possible to utilize known injection molding, extrusion, vacuum molding, die molding, etc. Injection molding using a stumper is especially preferred because a light extracting mechanism and light guide pipe is easy to form in one body.

The light extracting mechanism (light extractor) provided on a light reflecting surface and/or light emitting surface of the light guide pipe is formed with a plurality of minute convexes which have roughened surfaces (i.e., roughened protrusions) and/or minute concaves which have roughened bottoms (roughened concaves) (the constituent elements constituting the light extracting mechanism, i.e., roughened protrusions and roughened concaves, are referred to generally and collectively as "net dots" herein). Included are those net dots formed with a pattern due to shot blasting through a porous plate, a pattern with net dots obtained through screen-printing a pattern of net dots using half-transparent ink, a pattern embossed in a light guide pipe surface, and their combination of two or more. Among these, roughened protrusions and/or roughened concaves are preferable, and among these roughened protrusions which, e.g., are formed by photo-etching fabricated stumper molding, are especially preferred for the light extractor. Also, the surface-roughened protrusion can effectively cause scattering in the light incident on the roughened protrusions. This makes it possible to emit light with directivity under full control through the light guide pipe. Thus, the planar light source unit can be precisely controlled in optical characteristics, providing practical illumination light.

Figure 8E:
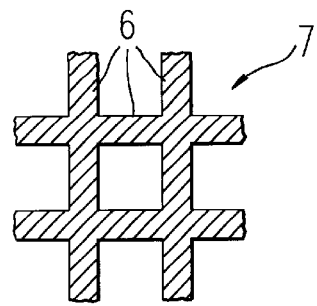
FIG. 8 is a fragmentary plan view showing various patterns of roughened protrusions and concaves suitably used as a light extracting mechanism in the planar light source unit of the invention.
Figure 8F:
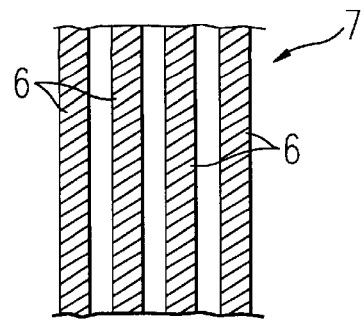
Figure 10D:
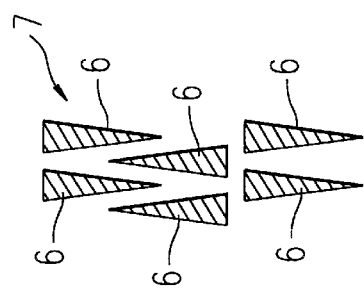
FIG. 10 is a fragmentary plan view showing various patterns of roughened protrusions and/or concaves suitably used as a light extracting mechanism in the planar light source unit of the invention.
Figure 10C:
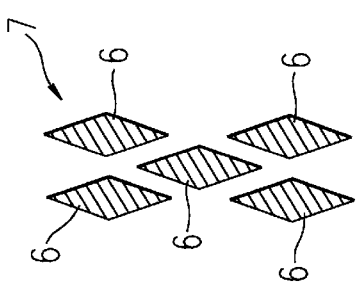
Figure 10B:
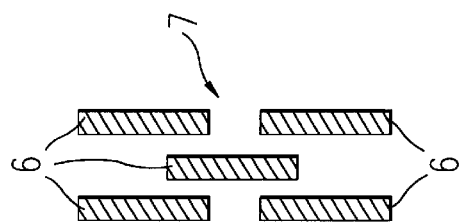
Figure 10A:
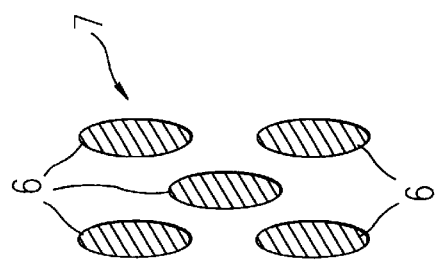

The planar form of the individual net dots (i.e. the shape of the net dot as viewed from above the light emitting surface) may be for example circular as in the conventional, but is preferably in a form having a major axis, e.g. an elliptical form (FIG. 10a), a rectangular form (FIG. 10b), a rhombic form (FIG. 10c) and a triangular form (FIG. 10d), etc. Net dots may be a grating (FIG. 8E) or stripes (FIG. 8F). Of these, the net dots in an elliptic form are easily made and hence especially preferred.

Figure 13A:
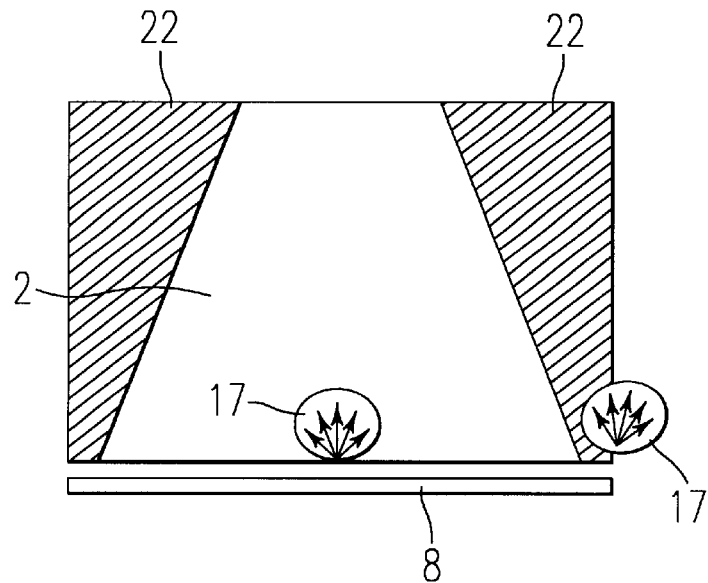
FIG. 13 is an explanatory view showing a light scattering state of the light guide pipe causing a dark region around a linear light source electrode in a sidelight schemed planar light source unit.
Figure 13B:
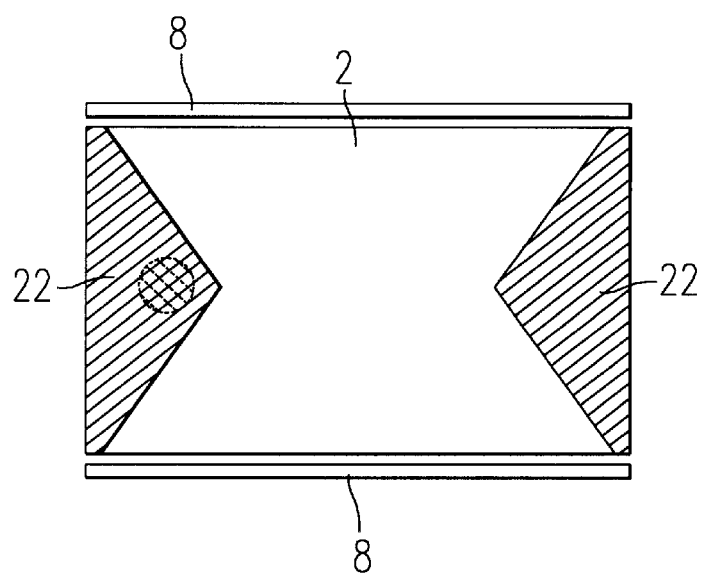

Also, the net dots preferably do not cause deviation in emission light as seen at the optical vectors of emitting light 35 in FIG. 13. In this viewpoint, roughened protrusions and/or roughened concaves preferably have a major axis, and the axis of each preferably is within 30 degrees, preferably 20 degrees, more preferably in substantially the same direction (i.e., $\leq 10°$ absolute, including 8°, 5°, 3° and all other values less than or equal to 10°) as the major axis of the others on the same surface of the light guide pipe. In addition, it is preferable that the major axis of the net dots be substantially perpendicular ($\pm 10°$) to the long axis of at least one linear light source when placed in a planar light source. It is also preferable to form the net dots such that they have a major axis extended along a direction substantially orthogonal to a light incident surface. More specifically, the effective aspect ratio α of the net dot is preferably 1.1 or greater, more preferably 1.3 or greater, and especially preferably 1.5 or greater. Most preferred values of α are 1.7 or greater.

Figure 11:
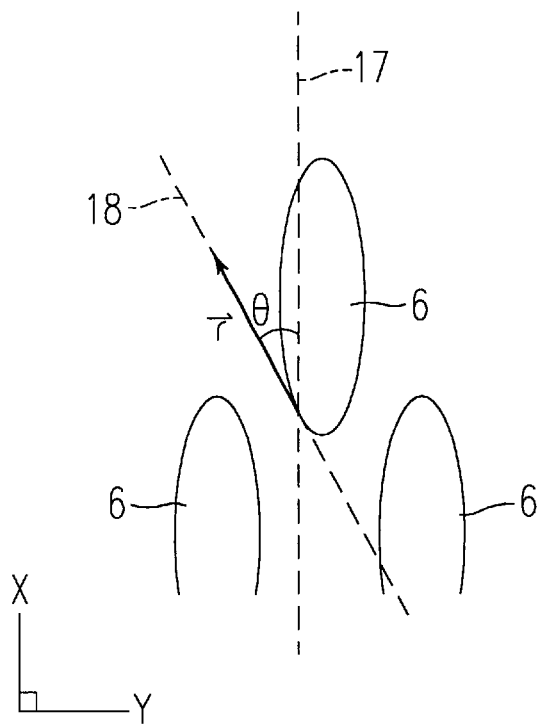
FIG. 11 is a structural explanatory view representing a coordinate system used in defining the effective aspect ratio and a tangential unit vector on a contour line of a roughened protrusion or concave dot pattern.
Figure 12:
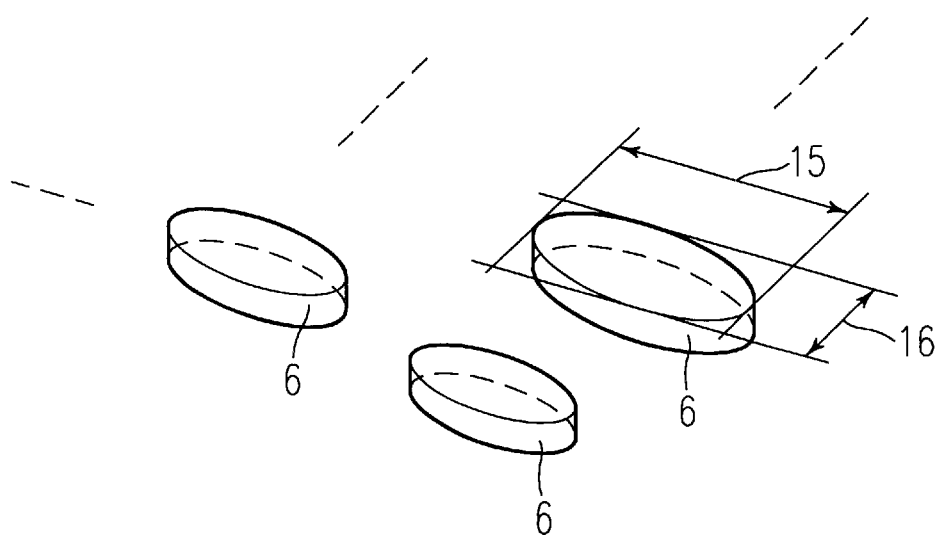
FIG. 12 is a perspective view magnifying convex-formed protruded roughened-surface dots to be provided on the light guide pipe for the planar light source unit of FIG. 5.

Here, the effective aspect ratio α, when a coordinate system is defined as in FIG. 11 and a sampling region of 10 mm×10 mm is taken thereon, is defined by the line integral for unit vectors in a tangential direction 18 on a contour line of an entire roughened protrusions and roughened concaves of a pattern existing in the sampling region.

$$\alpha = \int |\cos\theta| \cdot d\bar{r} / \int |\sin\theta| \cdot d\bar{r} \qquad \text{Equation 1}$$

In Equation 1 the angle θ is an angle given between the tangential line 18 and a straight line 17 representing a direction orthogonal to the light incident surface 3.

"A major axis" means a direction of the major line unit (a tangential direction) of a contour line of the each entire roughened protrusion and roughened concave.

"A major axis extended along in substantially a direction" means more than 50%, preferably 70%, most preferably 90% of each major axis of roughened protrusions and roughened concaves exist in the sampling region are oriented in a direction within ten degrees, preferably five degrees.

In a planar light source unit of the present invention, by forming net dots into a form having a major axis extended along (oriented) in a direction substantially orthogonal to a light incident surface, roughened protrusions and/or roughened concaves can effectively increase the light emitted from the side wall of the roughened protrusions and roughened concaves in a direction substantially orthogonal to a light incident surface and can provide satisfactory brightness evenly throughout the entire light guide pipe surface.

The area of net dot is not limited. It is preferred to improve the utilization efficiency of light by the planar light source unit and avoid a state that the net-dot pattern is visible at the light-emitting surface of the planar light source unit. Consequently, the area of a net dot viewed from above is preferably in a range of from 0.01 mm² to 0.5 mm², more preferably in a range of from 0.05 mm² to 0.4 mm² especially preferably in a range of from 0.1 mm² to 0.3 mm².

There is a relationship between light utilization efficiency (η), mean roughness in the protrusion roughened surface (Ra) and mean spacing in the roughened surfaces (Sm), that η is nearly proportional to Ra and inversely proportional to Sm. Accordingly, the size reduction of net dots and the spacing reduction between net dots can improve the light utilization efficiency. Also, the net dots on the light extracting mechanism, if made small in size, are preferred because of less possibility of causing interference due to a black matrix formed on the liquid crystal panel.

The net dots, if formed with roughened surfaces 27 at their protrusion tips or at their bottoms of concaves, are preferred because of effectively causing diffuse reflection of light, and the former is especially preferred.

Figure 9A:
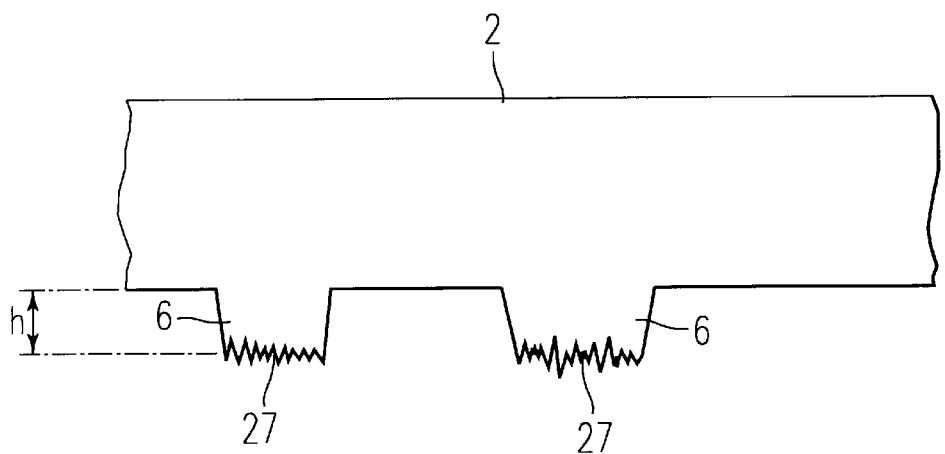
FIG. 9a is a fragmentary sectional view schematically showing, by magnifying, roughened surface protrusions as a light extracting mechanism used in the planar light source of the invention.
Figure 9B:
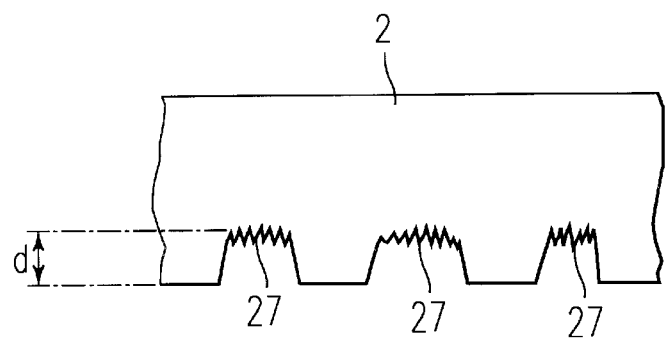
FIG. 9b is a fragmentary sectional view schematically showing, by magnifying, roughened concaves as a light extracting mechanism used in the planar light source of the invention.

The form of the net-dot protrusion roughened surface is preferably provided with a plurality of slant surfaces, as shown at 27 in FIG. 9a and FIG. 9b. Such protrusion roughened surface includes a case of forming one protrusion roughened surface with a set of a plurality of V-formed grooves.

Surface roughness of the roughened protrusions and the roughened concaves can be measured by ISO 468-198Z (E), and the value Ra is preferably not less than 0.2 μm.

The light incident on the net dots having roughened protrusions and/or roughened concaves will not totally reflect. One portion of the incident light is diffuse-reflected by the net dots and emitted through the light-emitting surface of the light guide pipe. The remaining light emits from the reflection surface to an outside of the light guide pipe where it is reflected upon the reflecting sheet and returned again into the light guide pipe. In this manner, light can be effectively diffuse-reflected. Further, by controlling the protrusion/concave roughened surface form as above, it is possible to obtain light having a practical directivity distribution with deviation of emission light eliminated or effectively reduced.

In the case the net dots are roughened surface protrusions, the height of the roughened surface protrusion (protruding amount: h in FIG. 9a) if too low is difficult to make the protrusion roughened surface. If too high, there occurs a problem of reducing the strength. Accordingly, the height is preferably 1 μm–50 μm, more preferably 2 μm–45 μm, and especially preferably 5 μm–40 μm.

In the case where the net dots are roughened bottom concaves, the depth of the roughened bottom concaves (d in FIG. 9b) if too shallow, it is difficult to get enough light extraction efficiency. If too deep, it is difficult to make the roughened concaves. Accordingly, the depth is preferably 1 μm–50 μm, more preferably 2–45 μm, and especially preferably 5 μm–40 μm.

The nets dots are preferably arranged such that the area density thereof increases with distance away from the light source in order to play a role in making even the amount of light to be emitted at the light emission surface. As a form for realizing this, the same size but greater number of net dots may be used to increase the density of net dots with distance farther from the light source, or the net-dot size may be increased as distance farther from the light source increases.

Of these, the way of increasing the net-dot size is more general because of ease in design.

The area density of net dots is preferably 3% to 65% in the area neighboring the light source, more preferably 10% to 50%, and in a center area of the display preferably 40% to 85%. In the scatter enhancing region the density of net dots preferably is 50% to 95%.

Also, the net dots are preferably arranged to have a major axis extended directed orthogonal (perpendicular) to the light incident surface in the light guide pipe as described above (i.e. perpendicular to an elongate axis direction of a linear light source in the case where the light source is a linear light source arranged along a light incident surface).

The light guide pipe may be provided with a light extracting mechanism in the light-emitting surface and/or the reflecting surface. For example, it is possible to put into practice a light guide pipe having a light extracting mechanism in the light emitting surface formed with roughened protrusions and/or roughened concaves as well as a multiplicity of net dots printed for example, in white ink in an area corresponding to a dark region in the light reflecting surface. There is a structure, as shown in FIG. 4, having a light extracting mechanism formed with roughened protrusions and/or roughened concaves as above in the light emitting surface wherein further the light extracting mechanism is provided in only an area close to a light incident surface in the light reflecting surface of the light guide pipe. The planar light source unit thus structured is effective by reducing or preventing a bright line from occurring in the vicinity of the light incident surface.

Meanwhile, it is extremely suited in view of making even the emission light amount to increase the density of net dots in an area (21 of FIG. 14) of the light reflecting surface corresponding to the dark region 22 of the light emitting surface (these areas are referred to as "scatter enhanced region"). The provision of a scatter enhanced region makes it possible to effectively emit light through the light emitting surface even in the dark region 22, providing a liquid crystal display having even brightness. For a two-light type planar light source unit particularly suitably used in the invention, it is to be considered that the scatter-enhanced region is generally triangular in shape exemplified as dark area 22 in FIGS. 13b and 14. The light scatter enhanced region preferably is in generally an isosceles triangle having as a base a line of intersection between a surface not provided with the light source of the light guide pipe and the light reflecting surface wherein a base angle $\psi$ is set at 20 to 60 degrees. More preferably the base angle $\psi$ is at 30 to 50 degrees, and especially preferably the base angle $\psi$ is at 35 to 45 degrees.

The net dots are preferably increased in the dark region even if the distance from the light source is relatively short so as to even the brightness throughout the entire light guide pipe surface, and also the net dots are further increased in the dark region even if the distance from the light source is relatively long.

The area density of the scatter-enhanced region (net dots density) is preferably from 50% to 95%, more preferably from 65% to 95%.

The scatter-enhanced region desirably has a density of roughened protrusions and roughened concaves 1.2 to 2 times higher as compared to that in a case of not providing the scatter enhanced region.

The light control sheet in the present invention can be selected from among any known light control sheets. A film of resin material having sufficient transparency, e.g., polyester and polycarbonate, having a prism array on the surface, whose shape can be transferred from a shape formed by photo-cured resin, e.g., acrylic resin can be used. As a prism array, for example, a triangular prism array, pyramidal prism array, cylindrical lens array can be selected. A light control sheet having a prism array comprising triangular prisms is most preferable.

The light control sheet in the present invention is provided in proximity to the light-emitting surface of the light guide pipe. The triangular prisms when applied are preferably directed at their top vertexes toward the light emitting surface, and further is arranged such that an arbitrary prism constituting the prism array has a generating line placed generally in parallel with the light incident surface (in a direction of a major axis of a linear light source where the light source is a linear light source). See for example FIGS. 1 and 2 where the lines formed by the vertexes are parallel with the light incident source.

The prism array comprising triangular prisms is preferably not easy to visibly confirm by an observer. Consequently, the triangular prism has a pitch width (distance between a generating line of a triangular prism and a generating line of an adjacent triangular prism: also referred to as a distance between triangular prisms) of preferably 1 $\mu$m to 500 $\mu$m, more preferably 5 $\mu$m to 200 $\mu$m, and especially preferably 10 $\mu$m to 100 $\mu$m.

The top vertex angle of the triangular prism is preferably controlled with relation to a directivity of light to be obtained. The triangular-prism top vertex angle is preferably 45 to 75 degrees, more preferably 50 to 70 degrees, and especially preferably 55 to 60 degrees.

Figure 15:
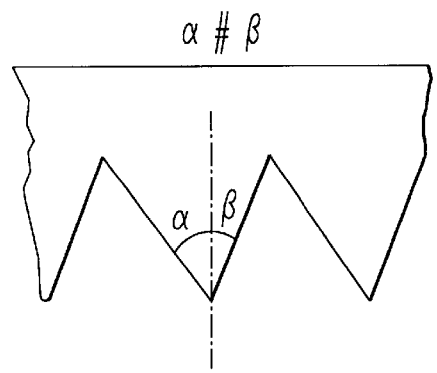
FIG. 15 is a view showing a sectional form of one example of triangular prism arrays.
Figure 25:
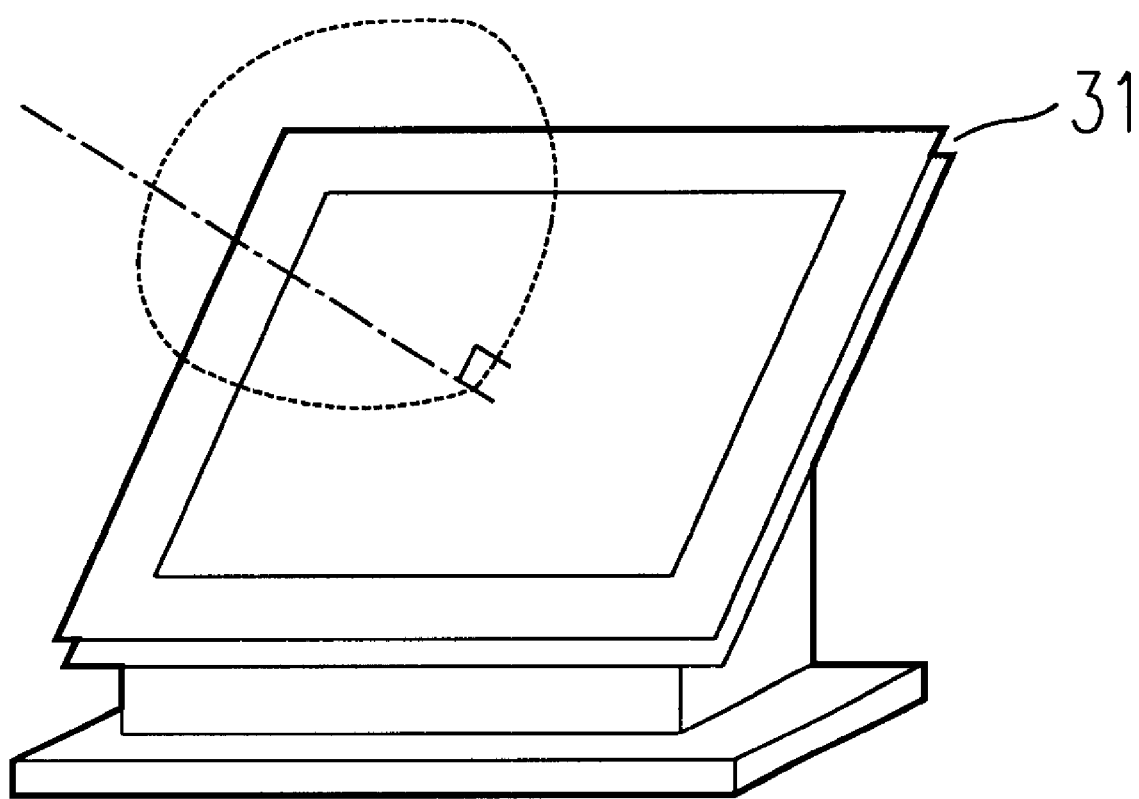
FIG. 25 is a perspective view showing a liquid crystal display monitor having as a backlight optical system a planar light source unit of the invention using an array with asymmetric triangular prisms shown in FIG. 11.

Furthermore, it is one of embodiments desired in the invention to use, in part or the entirety of a light control sheet, a prism array including a triangular portion that is asymmetric in section about a normal line of the light control sheet ($\alpha \neq \beta$), as shown in FIG. 15. The use of this light control sheet makes it possible to obtain a planar light source unit having an asymmetric distribution of view angle about a normal line of the light guide pipe light emitting surface. The use of the light control sheet of the above embodiment makes it possible to control a maximum-brightness direction. Thus, as shown in FIG. 25, a liquid crystal display device can be obtained which possesses preferred view angle characteristics.

Figure 16A:
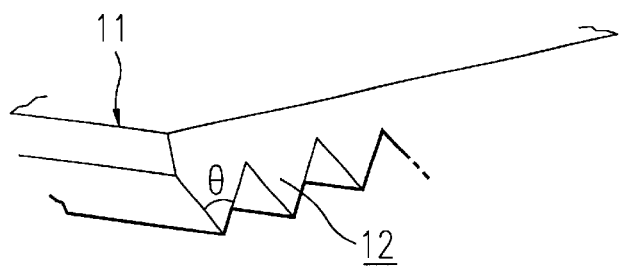
FIG. 16 is a sectional view partly showing various light control sheets used in the planar light source unit of FIG. 5.
Figure 16B:
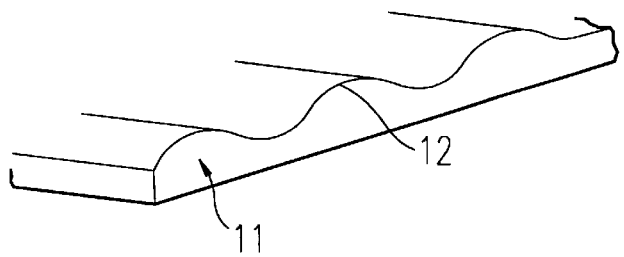
Figure 16C:
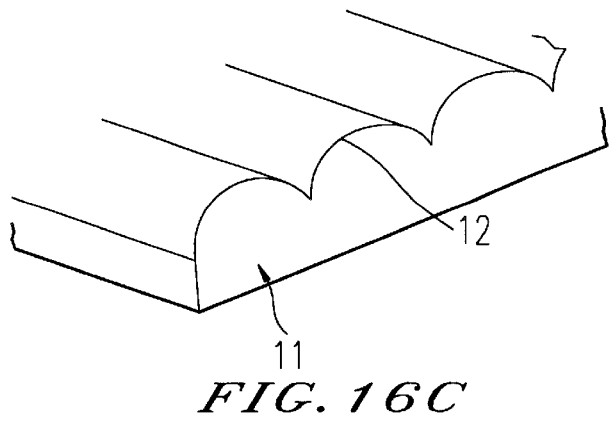

The light control sheet may be of any shape and preferably has a shape as depicted in FIG. 16B or FIG. 16C, besides the light control sheet as illustrated in FIG. 16A. These may be laminated, two or more. In the case of using two or more control sheets, the light control sheets are desirably arranged such that the prism-array generating lines are positioned in a cross form (in a vertical and twisted positional relationship as viewed from above). This arrangement can provide a multi-directional view angle characteristic.

Figure 17A:
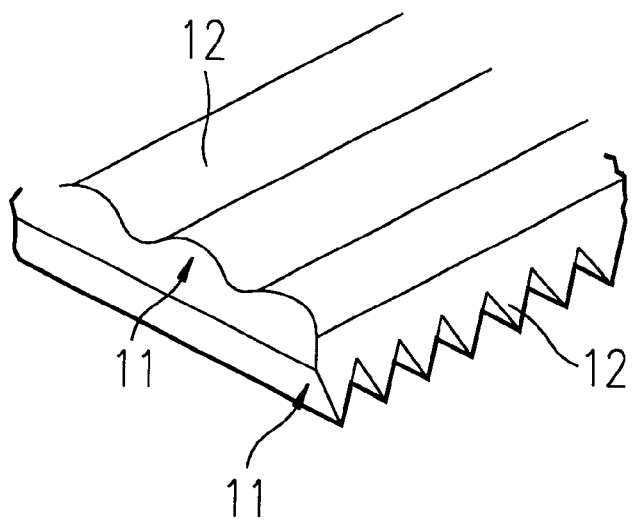
FIG. 17 is a fragmentary perspective view schematically showing various light control sheets having a second array light-collecting element used in the planar light source unit according to another embodiment of the invention.
Figure 17B:
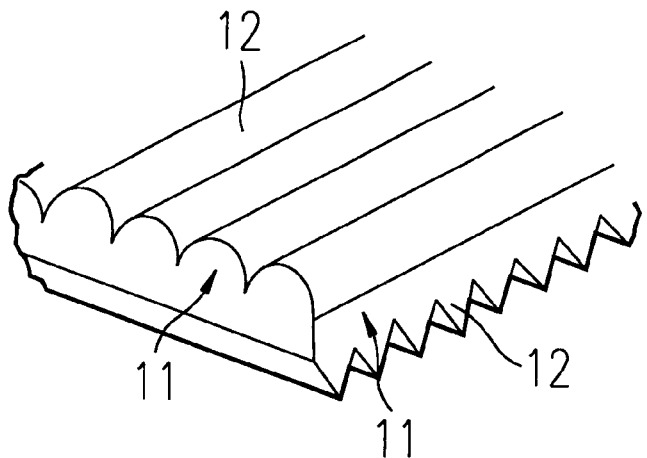

Also, the light control sheet may use a light control sheet having arrayed elements formed in both surfaces, as depicted in FIG. 17A and FIG. 17B. This is because of a view angle characteristic obtainable similar to the case of lamination with two light control sheet, easiness of fabrication and reduced structure in thickness.

The diffuser (diffusing sheet) is preferably provided close to the opposite surface to the surface having the prism array of the light control sheet. Also, a diffuser may be further provided close to the reflecting surface of the light guide pipe. Also, the diffuser may be provided close to the light-emitting surface of the light guide pipe. This causes disturbance in the emission light from the light guide pipe prior to incidence of the emission light on the prism array, thereby preventing against occurrence of interference fringes, etc.

The diffuser is not limited in structure or the like provided that it causes diffusion in the light from the-light control sheet. The diffuser of the invention includes, for example, a transparent sheet of polyester or the like coated thereon with acrylic beads, a light guide pipe coated directly with acrylic beads, and resin-make sheet roughened in its surface.

Meanwhile, a light shade pattern may be provided on the diffuser, as shown at 13 in FIG. 6A. The light shade pattern is preferably provided in an area close to the light source of the diffuser. Also, the net dots are preferably arranged to decrease in density with distance farther from the light source. The diffuser thus structured effectively utilizes a bright line close to the light source, thus making it possible to maintain even brightness by the planar light source unit and raise the brightness of the planar light source unit.

The reflecting sheet in the present invention is provided in proximity to the reflecting surface of the light guide pipe. The reflecting sheet has a surface arranged and ready to reflect light so that it reflects a light ray emitted from the light guide pipe back into the light guide pipe. The reflecting sheet can use a mirror-reflective reflecting sheet or a diffusion-reflective reflecting sheet, or a combination. However, especially preferred in the invention is a mirror-reflective reflection sheet having a light reflection characteristic, which means the incident angle is nearly equal to reflecting angle. For example, a sheet evaporated with a metal high in optical reflectivity, or the like. Metals high in optical reflectivity include silver, aluminum, etc. The reflecting sheet, by having a high reflectivity at its surface, enables the light emitted from the light guide pipe to effectively return into the light guide pipe. Meanwhile, where the light reflection characteristic is nearly mirror reflection, there occurs no disturbance in luminous flux having sharp directivity emitted from the light guide pipe. Thus, light is effectively incident on the triangular prism array having top vertexes directed to the light-emitting surface of the light guide pipe preferably used in the present invention. This makes it possible to maintain brightness by the planar light source unit.

The diffusion angle of the reflecting sheet is preferably 10 degrees or less, more preferably 5 degrees or less, and especially preferably 3 degrees or less. This is because, if the reflecting sheet has a small diffusion angle, the light illuminated to the reflecting sheet, upon reflection, is not spread in angular distribution of reflected light.

The diffusion angle herein means an angle (half-value angle) in which a half intensity of a reflected light ray is to be observed with a perpendicular taken at 0 degree, in an angular distribution of reflection light rays obtainable when collimated light such as laser is incident vertically on the reflecting sheet.

As shown in FIG. 6B, the reflecting sheet may be provided with a diffusion-reflective or light-absorptive pattern. Especially preferred is a diffusion-reflective pattern provided in white ink or the like on a positive-reflective reflecting sheet only in a close area 26 of the reflecting sheet to the light incident surface. The reflecting sheet thus structured diffuses reflection in the light close to the light incident surface, and thereby effectively prevents the occurrence of a bright line in the vicinity of the light-emitting surface. When using such a reflecting sheet, it is preferred not to provide net dots in a close area of the light guide pipe reflecting surface to the light incident surface, as shown in FIG. 6B.

In the present invention, when one of the light sources is put on, the vertical (i.e., orthogonal to the light incident surface) view-angle distribution characteristic of the emission light ray observed immediately above the light control sheet in a normal-line direction of the light emitting surface is to be represented by a characteristic diagram having a luminance [cd/m$^2$] on a vertical axis and an emission-light-ray emitting angle [degree] on a horizontal axis. The line representing a vertical view-angle distribution characteristic of an emission light ray in the normal line direction of the light-emitting surface has relatively steep and relatively slant regions with a boundary at a peak. The light guide pipe, the light control sheet, the reflecting sheet, the diffuser, the light extracting mechanism, etc. are adjusted such that, when the two light sources are both put on, the lines representing vertical view-angle distribution characteristics given respectively by the light sources intersect at their slant regions. In particular, the adjustment of prism vertex angle, provided in the light control sheet effectively serves in controlling the view-angle distribution of emission light.

Figure 22:
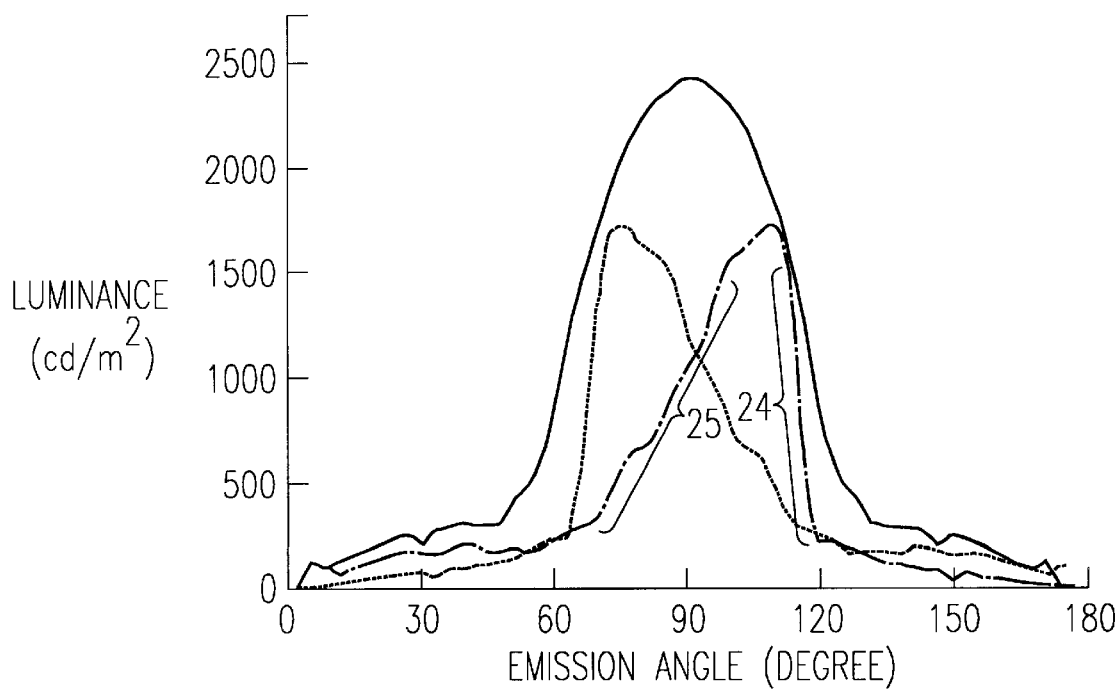
FIG. 22 is a characteristic diagram showing a view angle distribution of illumination light emitted from the planar light source unit of the invention.
Figure 23:
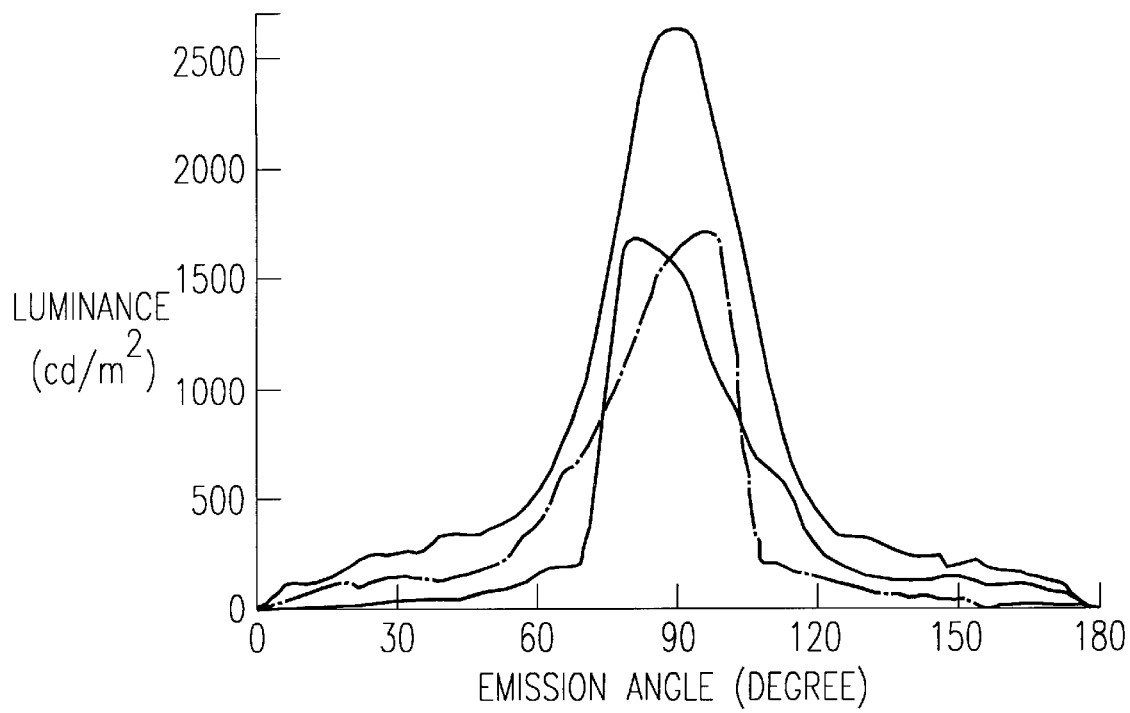
FIG. 23 is a characteristic diagram showing a view angle distribution of illumination light using a light control sheet designed to direct illumination light toward the front.

For example, as illustrated in FIG. 22, the emission light distribution obtained from one of the two light sources (dotted line) is intentionally shifted to broaden a resultant view-angle distribution of combined emission light for the two light sources (normal line). As apparent from FIG. 22, the emission light from one light source (represented by the dotted line) is largely deviated from a maximum luminance at 90 degrees, which itself is preferably not to be used in the planar light source unit. However, when combining the light from both light sources, the line representing view-angle distribution characteristics given by both light sources intersect at their slant regions. It is possible to obtain emission light having a maximum luminance at or near a view angle of 90 degrees (deviation is less than 10 degree from 90 degree). Thus, emission light is obtained which has less luminance change and glare.

Figure 21:
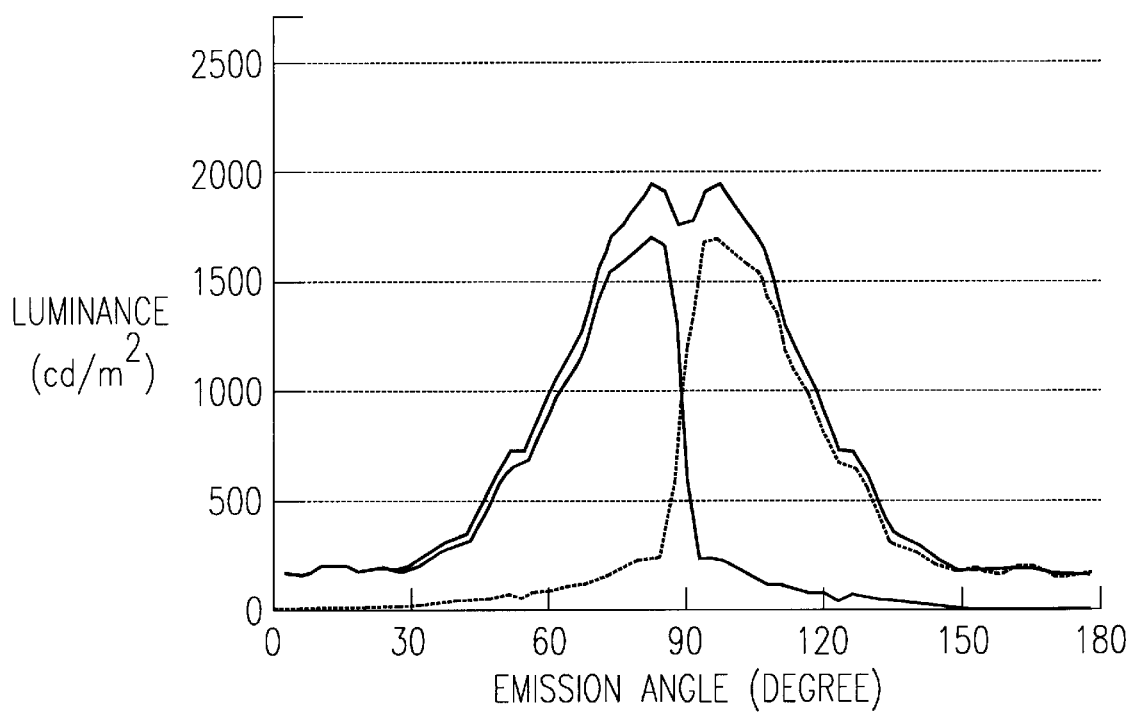
FIG. 21 is a characteristic diagram showing a view angle distribution of illumination light emitted from a planar light source unit shown as another example.

As a result, the following preferable planar light source unit having emission angle profile can be obtained:
Bell Shape.
Half-value angle (horizontal): 30 to 70 degrees, more preferably 35 to 65 degrees.
Half-valve angle (vertical): 10 to 40, more preferably 15 to 35 degrees.
Luminance uniformity:
  Less than 40%, more preferably less than 25%, most preferably 20 to 5%, where the luminance uniformity is defined as ((maximum luminance)−(minimum luminance))/(mean luminance) □100.0%.
Surface mean luminance: e.g. 2000 to 7000, more preferably 2500 to 6000 cd/m$^2$.

Where the lines representing view-angle distribution characteristics given by the light sources intersect at their steep region when the both of lights are combined as shown in FIG. 21, the resultant distribution of emission light results in a two-mountain form. This is not necessarily preferred. The absolute and relative slopes of the curves (lines) in the Figures provide preferred steep and slant regions.

The planar light source unit according to this invention can be used for liquid crystal display devices and other display boards. In typical examples of the liquid crystal display devices, utilizing the orientation order of liquid crystalline materials, e.g. polyimide orientation film with nematic liquid crystal, a voltage is applied into an arbitrary display unit, or an electric current is applied, thereby changing the orientation state of the liquid crystal, and the display is effected by using a liquid crystal cell for changing the optical transmittance or optical reflectivity.

The net dots (protrusions and concaves) of the invention may be made by conventional methods. The net dots appearing in the Examples were made by polishing a metal plate, patterning with a photoresist (masking, exposure, development) followed by etching (e.g., FeCl$_3$) to provide a stamper or die used in injection molding to produce the light guide pipe. Alternatively, one could use a photoresist as above followed by sand blasting or Ni electro-forming. Such techniques are within the skill of the ordinary artisan.

EXAMPLES

The invention will now be further explained by way of non-limiting examples. Examples including a letter designation (e.g., Example 1A) are less preferred for LCDs and tend to have a less desirable relationship between steep and slant regions. This relationship can be controlled by the angle of the prisms as well as by peripheral parts of the light guide pipe (e.g. diffuser, light reflecting sheet, etc.). A main difference between Examples with and without a letter designation is the angle of prisms.

Example 1

A planar light source unit of a structure as shown in FIG. 1 was manufactured. [See Example 4 infra] An acrylic-resin-make light guide pipe having a size of 350 mm by 285 mm and a thickness of 5 mm was used as a light guide pipe. Two cold cathode fluorescent lamps each having a tubular diameter of 2.6 mm were provided as linear light sources on opposite sides of the light guide pipe. A plurality of surface-roughened protrusions were provided regularly as a light extracting mechanism on a reflection surface of the light guide pipe such that they increase in area with distance from the linear light source. The surface-roughened protrusion had a protrusion amount of 15 $\mu$m. Also, the surface-roughened protrusions were in the shape of an ellipse having an effective aspect ratio α of 1.8. The surface-roughened protrusions had their major axis perpendicular to a light incidence surface of the light guide pipe (i.e. orthogonal to the long axis of the linear light source). The surface-roughened protrusions had a mean area of 0.25 mm². Rα was 2.1 μm.

A mirror-reflective reflecting sheet was provided in a vicinity of the reflection surface of the light guide pipe. The reflecting sheet is formed of resin evaporated with silver. The reflecting sheet had an optical reflectivity of 95%. Also, the reflecting sheet had a diffusion angle of 1.7 degrees.

A light control sheet was provided in the vicinity of a light-emitting surface as shown in FIG. 1. The light control sheet was arranged with a prism array having triangular prisms having a prism vertex of 63 degrees arranged at a pitch interval of 50 μm on a polyethylene terephthalate base material film having a thickness of 180 μm.

The reflector was a white film-formed reflector having a reflectivity of 94%.

In lighting the planar light source unit, two cold cathode fluorescent lamps were independently controlled. That is, lighting was made using an exclusive inverter unit such that tube currents supplied to the two cold cathode fluorescent lamps were constant. The planar light source unit was fixed on a three-axes-controlled positioning table, to measure brightness on 25 points sampled by dividing into six equivalent lengths in longitudinal and horizontal direction on the light-emitting surface of the light guide pipe by the use of TOPCOM BM-7. A result of measurement is shown in Table 1 (71).

Figure 18:
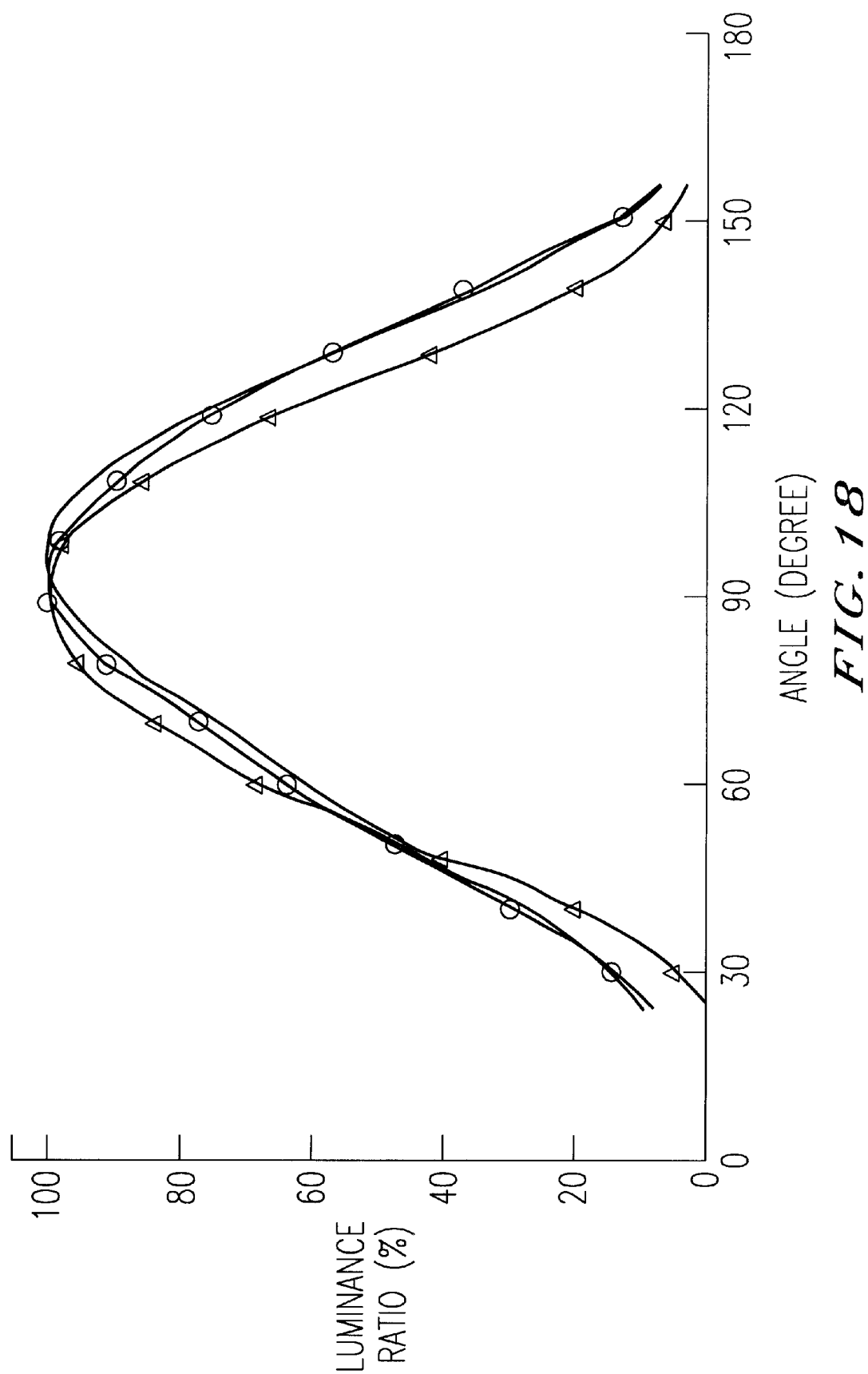
FIG. 18 is a characteristic diagram showing emission angle distributions in a linear light source parallel direction (Y-axis direction) around a linear light source electrode in an example of the invention and a comparative example.

FIG. 18 shows a distribution of emission angle in the vicinity of a linear light source electrode (about 5 mm distant from the electrode) with respect to a direction parallel with the linear light source (in a y-z plane). It is to be understood from this, as preferable effect of elongated surface-roughened protrusions to orthogonal direction of light incident surface, the planar light source unit of Embodiment 1 has an emission angle peak in the 90-degree position and there is no occurrence of dark area at the side of light guide pipe nearby the lamp position.

Example 2

Figure 2:
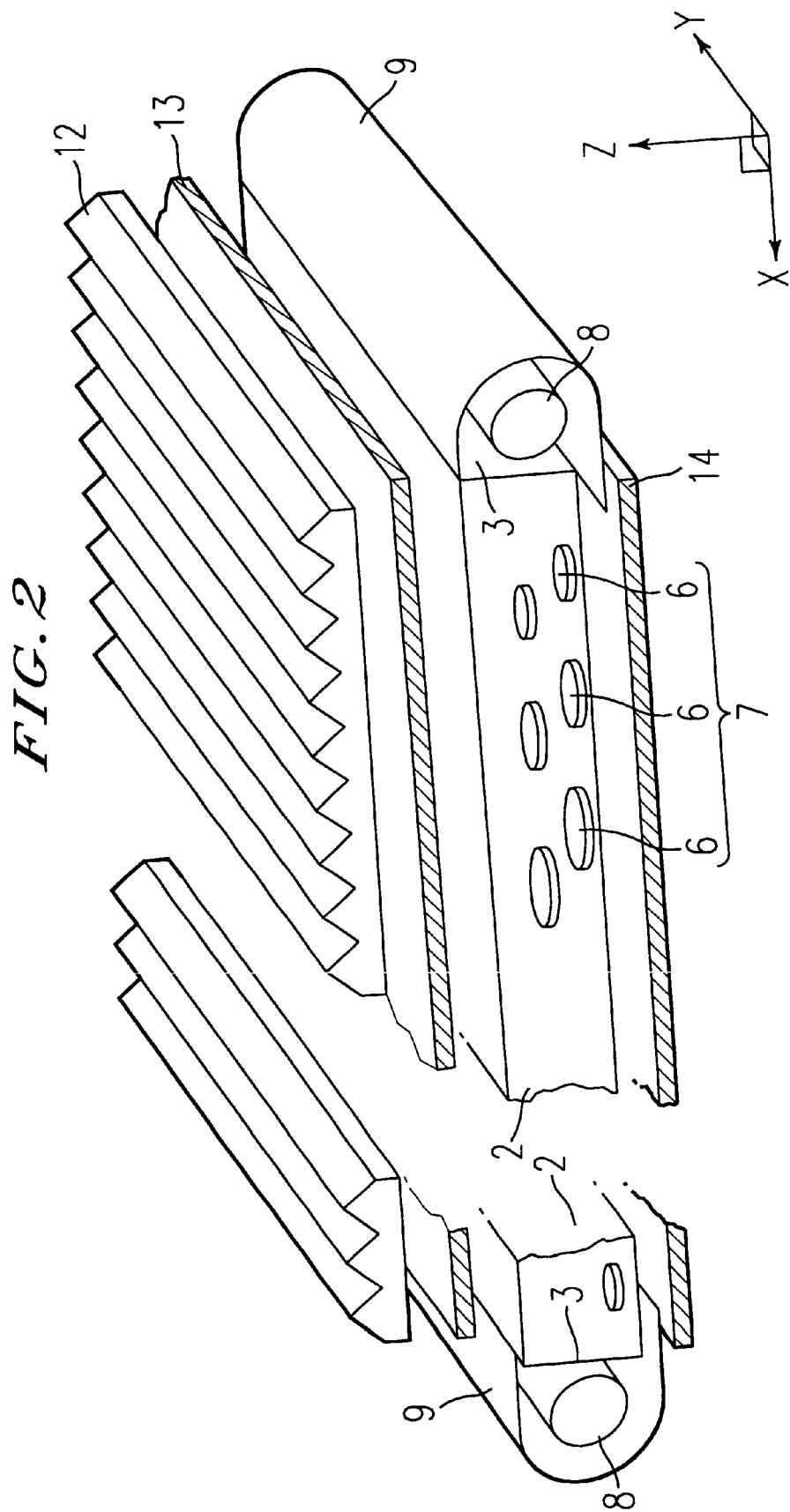
FIG. 2 is a perspective view schematically showing a planar light source unit according to a second embodiment of the present invention.
Figure 7:
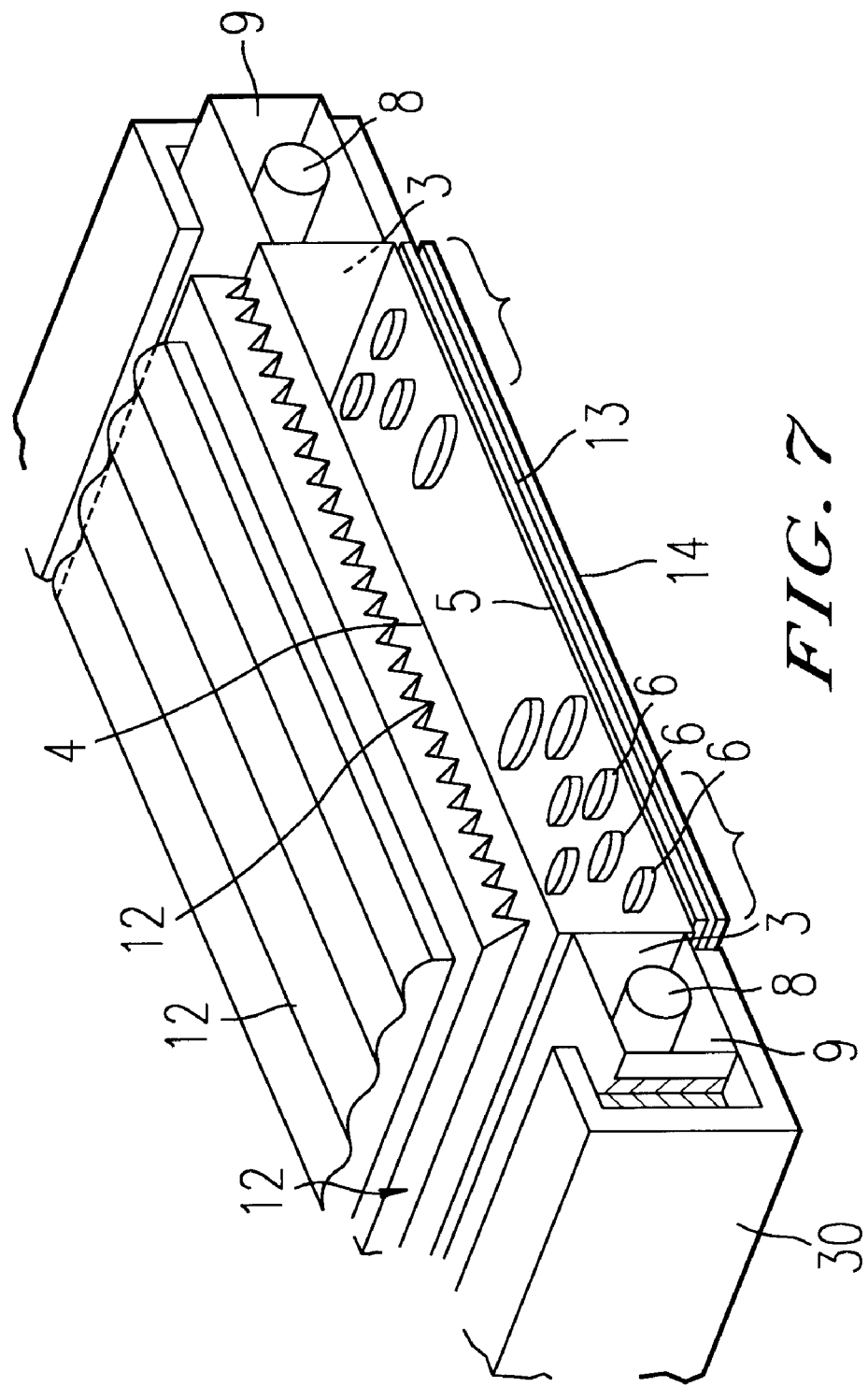
FIG. 7 is a fragmentary perspective view showing the planar light source unit according to a second embodiment of the invention.

A planar light source unit was manufactured with a structure as shown in FIG. 2. This is different in vertex direction of triangular prisms on a light control sheet from the planar light source unit of Embodiment 1.

The reflecting sheet was a diffusion-reflective reflecting sheet made of cellular polyethylene. This reflecting sheet had an optical reflectivity of 94%. A diffusion sheet (diffuser) was provided in the vicinity of a light-emitting surface of the light guide pipe. The diffusion sheet is coated with acrylic beads having a HAZE of 80%. The light control sheet used a prism array having triangular prisms having a vertex angle of 90 degrees arranged at an interval of 50 μm on polyethylene terephthalate.

The planar light source unit was fabricated similarly to Embodiment 1 in other points. Table 1 shows the result of brightness values (72). Also, FIG. 18 shows the distribution characteristic of emission angle in the y-z plane.

Example 1A

A planar light source unit was manufactured similarly to Embodiment 1 except that surface-roughened protrusions were arranged in positions rotated by 90 degrees (major axis or direction of entire protrusion?). Table 1 shows an estimation of brightness values while FIG. 18 shows a distribution characteristic of emission angle in the y-z plane (73). From FIG. 19, it is to be understood in the case of Example 1A that the emission angle distribution has a peak deviating from 90 degree and hence brightness is reduced in the forward direction.

TABLE 1

| | SURFACE MEAN LUMINANCE (cd/m²) | LUMINANCE UNIFORMITY (MAX. VALUE-MIN. VALUE)/ MEAN VALUE × 100.0 (%) | LUMINANCE UNIFORMITY (CENTER LUMINANCE)/ (CORNER-LUMINANCE AT 10-MM AREA) × 100 (%) | DARKNESS VISIBILITY ON PANEL | CRT TUBE CURRENT (mA) | APPLICABILITY OF USE ⊚-remarkably practical ○-practical Δ-difficult to satisfy consumer needs x-not practical | |
|---|---|---|---|---|---|---|---|
| | | | | | | MONITOR | FLAT PANEL TV |
| EXAMPLE 1 | 2871 | 6.2 | 116.5 | NONE | 7.0 | ⊚ | ○ |
| EXAMPLE 2 | 2325 | 4.1 | 112.4 | NONE | 7.0 | ○ | ○ |
| EXAMPLE 1A | 2745 | 12.5 | 129.6 | PRESENT | 7.0 | Δ | Δ |

Application for use is evaluated with human eyes.

Example 3

A planar light source unit of a structure as shown in FIG. 4 was fabricated. An acrylic-resin light guide pipe of 12 inches with a thickness of 5 mm was used as a light guide pipe. The light extracting mechanism of Example 1 was formed on a light-emitting surface. A white-inked pattern of net dots was provided on a light-reflecting surface of the light guide pipe in an area close to a light incident portion thereof, in order to suppress dark line phenomenon in the light incident portion.

A light control sheet 21 was provided in proximity to the light-emitting surface. The light control sheet was structured by providing a prism array arranged at a pitch interval of 150 μm with triangular prisms having a vertex angle of 60 degrees on a 120 μm-thick polyethylene terephthalate base film. A diffuser with a haze of 70% was formed on a surface not formed with the light control sheet prisms. Thus, a planar light source unit was manufactured with the other conditions determined similar to those of Example 1. The manufactured planar light source unit was measured for luminance values similarly to Example 1. A result of measurement is shown in Table 2.

Example 4

A planar light source unit of a structure as shown in FIG. 1 was manufactured.

A molded plate that was made from acrylic resin was used as the light guide pipe. The stumper was prepared to make a light guide pipe. 5 mm-thick stainless steel plate was used as a basic plate for mold. 25 □m-thick dry-film-resist (manufactured by Nihongousei Co.) was pasted on the basic plate by means of photo-mask-plotter RG-6500 (manufactured by Dainihon screen Co.). The basic plate was exposed to make the dry-film-resist firm to be a masking region, which will not be surface-roughed protrusion in the future. The basic plate was dipped into the liquid that contained FeCl3. Masking prevents FeCl3 from eroding the basic plate. On the contrary, the region that was not covered with masking was eroded by FeCl3 to be hollow (concave) region. (The hollowed region corresponding to surface-roughed protrusion.) Masking was removed from the basic plate. Like this, the basic plate of mold for a light guide pipe was prepared.

Injection molding method was applied to make a light guide pipe. Molten acrylic resin was poured into the stumper and quenched to be a light guide pipe. The temperature of molten resin was 260 □, and that of stumper was 85 □. Requested time to fill the mold with a molted resin was 7 seconds.

The size of the light guide pipe 11 was 350 mm by 285 mm and a thickness of 5 mm. The plural surface-roughened protrusions 6 on the reflection surface of the light guide pipe are act as a light extracting mechanism. The surface-roughed protrusions 6 were made as they constitute the (2-dimensional) simple square lattice point (see FIG. 14). The distance of neighboring surface-roughed protrusions 20 are 400 □m. The area of the surface-roughed protrusions increases as the distance from the linear light source increases. The length of major axis of the surface-roughed protrusions that have the shortest distance toward the linear light source (6b) are 248 □m and that of minor axis are 124 □m. On the other hand, the length of major axis of the surface-roughed protrusions that have the longest distance from the linear light source (6d) are 334 □m, and that of the minor axis are 167 □m.

Figure 14:
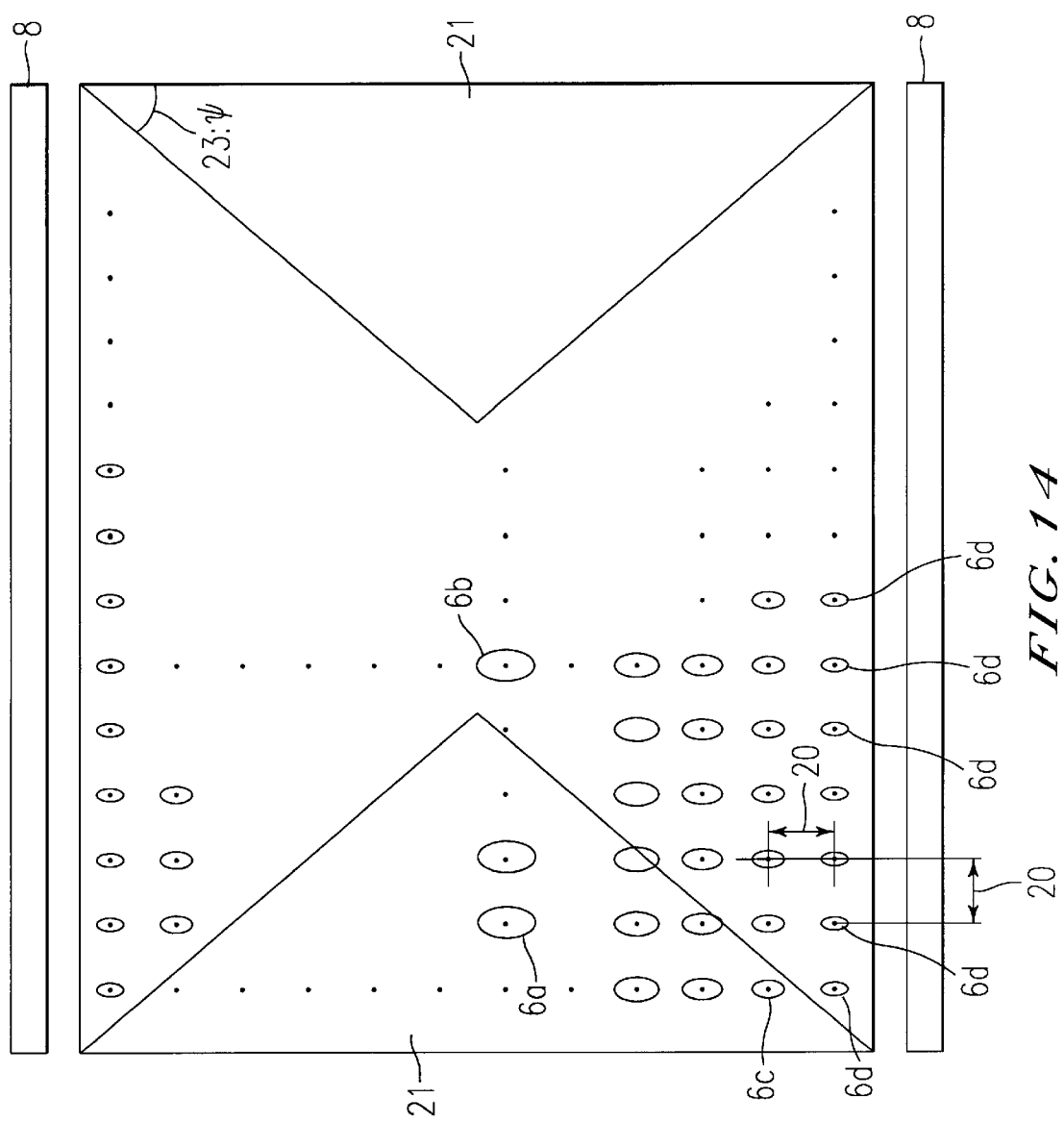
FIG. 14 is an explanatory view schematically showing a scatter-enhancing region provided on the light guide pipe of the planar light source unit of FIG. 5.

As shown in FIG. 14, the light scatter enhanced region 21 was provided on the light guide pipe. The light scatter enhanced region has the shape of isosceles triangle wherein the base angle 23 is 40 degrees.

The length of major axis of the surface-roughed protrusion 6a, which has the longest distance from the linear light source in the light scatter region, is 384 □m. And that of minor axis is 192 □m.

Compared with the surface-roughed protrusion 6a and the surface-roughed protrusion 6b, both have the same distance from the light source and have different area. The surface-roughed protrusion 6a is about 1.3 times larger than the surface-roughed protrusion 6b in area.

A light control sheet 11 was provided in the vicinity of a light-emitting surface as shown in FIG. 1. The light control sheet was arranged with a prism array having triangular prisms having a prism vertex of 58 degrees arranged at a pitch interval of 50 □m on a polyethylene terephthalate base material film having a thickness of 120 □m.

A diffuser was made on the surface of the light control sheet where there is not prism array. The diffuser was coated with acrylic beads, whose mean diameter of particles are 45 □m. The diffuser had a HAZE of 30%.

A reflecting sheet was provided in a vicinity of the reflection surface of the light guide pipe. The reflecting sheet is formed of resin evaporated with silver.

Figure 19:
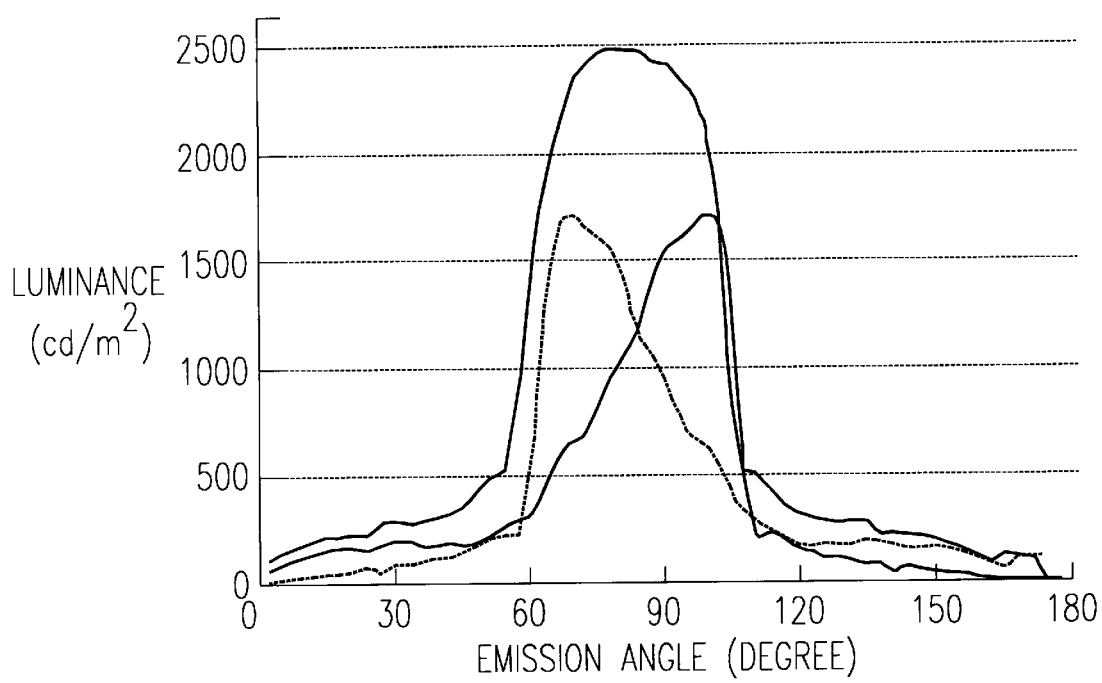
FIG. 19 is a characteristic diagram showing one example of view angle distributions in a planar light source unit using a triangular prism array in an asymmetric triangular form.
Figure 20:
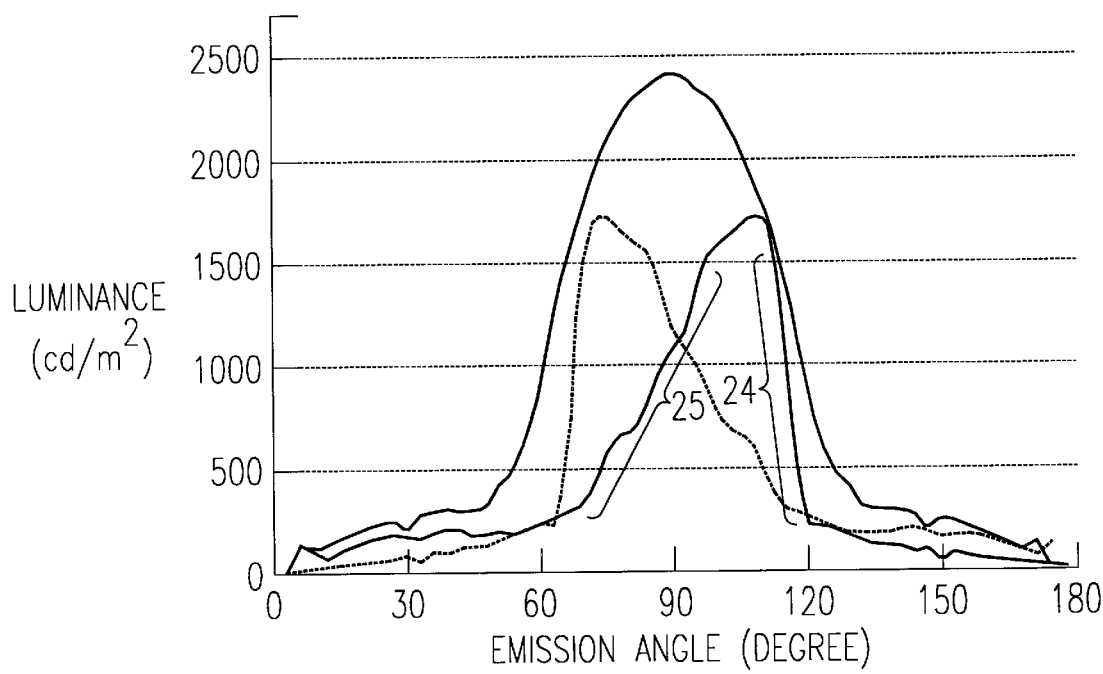
FIG. 20 is a diagram showing view angle distributions in a planar light source unit obtained in Example 4.

Two cold cathode fluorescent lamps each having a tubular diameter of 2.6 mm (manufactured by Harison electronic Co.) was provided as linear light sources on opposite sides of the light guide pipe. Inverter units (HIU 742 manufactured by Harison electronic Co.) were used for the current, which flows in the cold cathode fluorescent lamps, to be 6 mA. TOPCOM BM-7 was used to measure brightness on 25 lattice points sample by dividing into six equivalent length in longitudinal and horizontal direction on the light-emitting surface of the light guide pipe. The result is shown in Table 2. A characteristic curve of a vertical (i.e., orthogonal to the light incident surface) emitting angle is shown in FIG. 19. FIG. 19 is a chart representing the view angle distribution characteristic of an emission light ray in a normal direction of the light emitting surface, as represented by a characteristic diagram having a luminance taken on a vertical axis and an horizontal axis. The dotted line represents a view angle distribution characteristic of an emission light ray observed immediately above the light control sheet in a normal line direction of the light emitting surface when any one of the light sources is put on. The solid line represents a view angle distribution characteristic of an emission light ray observed immediately above the light control sheet in a normal line direction of the light emitting surface when both the light sources are put on.

Example 5

Figure 24:
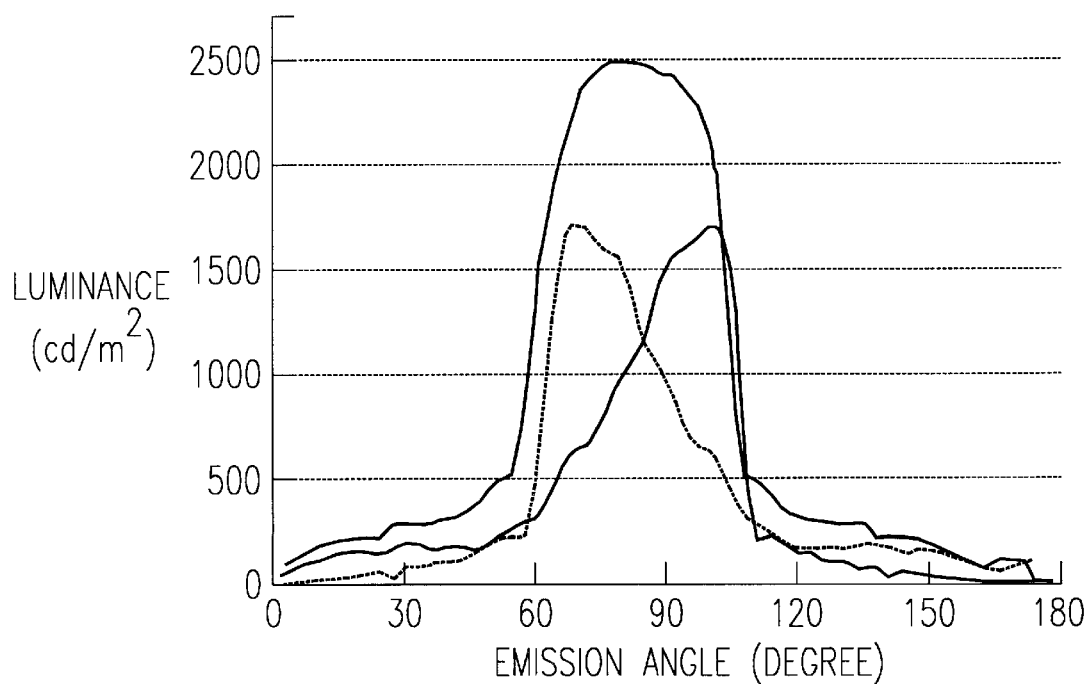
FIG. 24 is a characteristic diagram showing a view angle distribution of illumination light where obtaining an asymmetric illumination light angle distribution due to properly combining light rays using a light control sheet comprising an asymmetric triangular prism array.

A planar light source unit was manufactured similarly to Example 3 excepting that a prism array was formed using triangular prisms having an α of 25 degrees and β of 34 degrees where vertex angles of a light control sheet were defined as α and β in FIG. 15. Results of luminance distribution is shown in Table 2. A characteristic curve of a view angle distribution is shown in FIG. 24. FIG. 24 is a chart representing a vertical view angle distribution characteristic of an emission light ray in a normal direction of the light emitting surface, as represented by a characteristic diagram having a luminance [cd/m$^2$] taken on a vertical axis and an emission angle [degree] of an emission light ray on a horizontal axis. The dotted line represents a vertical view angle distribution characteristic of an emission light ray observed immediately above the light control sheet in a normal line direction of the light emitting surface when any one of the light sources is put on. The solid line represents a view angle distribution characteristic of an emission light ray observed immediately above the light control sheet in a normal line direction of the light emitting surface when both the light sources are put on.

Example 2A

A planar light source unit was manufactured similarly to Example 3 except that triangular prisms for a light control sheet had a vertex angle of 70 degrees. A result of measurement of luminance distribution is shown in Table 2.

Example 3A

A planar light source unit was manufactured similarly to Example 3 except that triangular prisms for a light control sheet had a vertex angle of 80 degrees. A result of measurement of luminance distribution is shown in Table 2.

Example 4A

A planar light source unit was manufactured similarly to Example 3 except that triangular prisms for a light control sheet had a vertex angle of 50 degrees. A result of measurement of luminance distribution is shown in Table 2.

TABLE 2

|  | MAX. LUMINANCE (cd/m²) | TRIANGULAR PRISM ARRAY TOP VERTEX ANGLE (DEGREES) | FORM OF VIEW ANGLE DISTRIBUTION | HALF-VALUE ANGLE (DEGREES) | GLARE | APPLICABILITY TO PC MONITOR | APPLICABILITY TO LIQUID CRYSTAL TV |
|---|---|---|---|---|---|---|---|
| EXAMPLE 3 | 2411 | 60 | ONE-MOUNTAIN DISTRIBUTION | 49 | NONE | O | O |
| EXAMPLE 4 | 2357 | 58 | ONE-MOUNTAIN DISTRIBUTION | 51 | NONE | OO | OO |
| EXAMPLE 5 | 2586 | 59 (ASYMMETRIC) | ONE-MOUNTAIN DISTRIBUTION | 51 | NONE | OO | OO |
| EXAMPLE 2A | 1957 | 70 | TWO-MOUNTAIN DISTRIBUTION | 61 | PRESENT | x | x |
| EXAMPLE 3A | 1760 | 80 | TWO-MOUNTAIN DISTRIBUTION | 68 | PRESENT | x | x |
| EXAMPLE 4A | 1421 | 50 | TWO-MOUNTAIN DISTRIBUTION | 72 | PRESENT | x | x |

In the table 2, the marks represents as follows;
OO—remarkably practical
O—practical
Δ—difficult to satisfy consumer needs
x—not practical Example 6

A planar light source unit of a structure shown in FIG. 5 was manufactured.

A light extracting mechanism was provided on a light-emitting surface of a light guide pipe. The light extracting mechanism had a plurality of surface-roughened protrusions set such that the net dots were increased in area with distance farther from the light source. The surface-roughened protrusion was in an elliptic form having an aspect ratio of 2 with a protrusion amount of 15 μm.

Furthermore, a generally isosceles triangular form having as a base a line of intersection between a light guide pipe surface having no light source and a light reflecting surface to provide a light scatter enhancing region in a portion thereof having a base angle of 40 degrees. This portion has a net-dot area set 1.44 times greater as compared to that in the other region (point same in distance from the light source as that net dots) (the area density was 87%). In a boundary between the light scatter enhancing region and the other region, the net dot (surface-roughened protrusion) area did not abruptly vary but was controlled to provide smooth change.

A diffuser with a haze of 30% was provided between the light guide pipe reflecting surface and the reflecting sheet.

The reflector used a member obtained by sheet metal work on lamination of a stainless steel sheet having a thickness of 0.1 mm and a sheet evaporated with silver. The reflector has a width of an opening set as 4.7 mm. This value is narrower than a width of the light guide pipe (5 mm). Consequently, press-fit fixing was used to close the light guide pipe by the reflector.

Also, the reflector at its backside was bonded with a urethane adhesive sheet as an adhesive fixing member. Due to this, the reflector undergoes stresses in a direction pressed toward the light guide pipe from the plastic frame accommodating the planar light source unit. Furthermore, the plastic frame accommodating the planar light source unit is provided with a guiding mechanism. This correctly fixes a positional relationship between the light guide pipe and the reflector, effectively preventing occurrence of a bright line.

Thus, a planar light source unit was manufactured with other conditions are the same as those of Example 1. Distribution of luminance value is shown in Table 3.

Example 7

A planar light source unit was manufactured similarly to Example 6 excepting that a second light control sheet was provided which has a corrugated light collecting element formed on a top surface of the sheet as shown in FIG. 16B. A generating line of a prism array of the second light control sheet and a generating line of a prism array of the first light control sheet are arranged in a manner depicting a cross (in a vertical and twisted positional relationship as viewed from above). The second light control sheet has an interval of prisms of 30 μm.

Example 8

A planar light source unit was manufactured similarly to Example 6 excepting that triangular prisms with a top vertex angle of 50 degrees were formed at an interval of 50 μm in a sheet form in the light control sheet and a second light control sheet was used similar to Example 7. The diffuser was removed and the light guide pipe at its light-emitting surface was formed as a mat surface having a haze (JIS K6719)of 40%. Distribution of luminance value was measured in the same way as Example 1. A result of measurement is shown in Table 3.

Example 9

A planar light source unit was manufactured similarly to Example 6. The net dot was in a rhombic form with an aspect ratio of 3 and has a mean area of 0.15 mm². Also, a light control sheet was used which has triangular prisms arranged on a surface close to the light guide pipe and a corrugated light collecting element provided on the other surface as shown in FIG. 17A. The triangular prisms had a top vertex angle of 58 degrees and an interval of 50 μm.

Example 10

A planar light source unit was manufactured similarly to Example 6. A mat surface was provided in the surface of the light guide pipe in place of a diffuser similarly to Example 8. An asymmetric triangular prism was used as shown in FIG. 15. The triangular prism had top vertex components of α of 25 degrees and β of 34 degrees. On the light control sheet, a second light control sheet was provided similarly to Example 7. View angle distribution at this time had a characteristic curve shown in FIG. 24. FIG. 24 is a chart representing a view angle distribution characteristic of an emission light ray in a normal direction of the light emitting surface, as represented by a characteristic diagram having a luminance [cd/m²] taken on a vertical axis and an emission angle [degrees] of an emission light ray on a horizontal axis. The dotted line represents a vertical view angle distribution characteristic of an emission light ray observed immediately above the light control sheet in a normal line direction of the light emitting surface when any one of the light sources is put on. The solid line represents a vertical view angle distribution characteristic of an emission light ray observed immediately above the light control sheet in a normal line direction of the light emitting surface when both the light sources are put on.

Example 10

A planar light source unit similarly to Example 6 was manufactured. The differences between a planar light source unit of Example 6 and that of Example 5A are as follows; White reflecting sheet was used in Example 5A. Triangular prisms for a light control sheet had a vertex angle of 90 degrees in Example 5A.

A result of measurement of luminance distribution is shown in Table 3.

TABLE 3

| SURFACE MEAN LUMINANCE (cd/m²) | LUMINANCE UNIFORMITY (MAX. VALUE-MIN. VALUE)/MEAN VALUE × 100.0 (%) | INVERSION PHENOMENON TO HORIZONTAL DIRECTION | HALF-VALUE ANGLE (HORIZONTAL/ VERTICAL) | CRT TUBE CURRENT (mA) | APPLICABILITY OF USE | | REMARK |
|---|---|---|---|---|---|---|---|
| | | | | | MONITOR | FLAT PANEL TV | |
| EXAMPLE 6  2465 | 8.5 | NONE | 105°/58° | 7.0 | OO | O | |
| EXAMPLE 7  2871 | 7.4 | NONE | 91°/52° | 7.0 | OO | O | |
| EXAMPLE 8  2521 | 6.5 | NONE | 91°/74° | 7.0 | O | O | |
| EXAMPLE 9  2759 | 7.3 | NONE | 90°/72° | 7.0 | OO | O | |
| EXAMPLE 10 2814 | 7.0 | NONE | 90°/69° | 7.0 | OO | OO | |
| EXAMPLE 5A 2088 | 8.5 | PRESENT | 93°/65° | 7.0 | Δ | Δ | INSUFFICIENT LUMINANCE |

In the table 3, the marks represents as follows;
OO—remarkably practical
O—practical
Δ—difficult to satisfy consumer needs
x—not practical Japanese patent applications JP11-266321, JP11-304514 and JP11-266320 are incorporated herein by reference.

With regard to the Figures, the following elements are used:
1. a planar light source unit
2. a light guide pipe
3. a light incident surface of a light guide pipe
4. a light emitting surface of a light guide pipe
5. a light reflecting surface (a light reflection surface)
6. surface-roughened protrusion (net dot)
7. a light extractor (a light extracting mechanism)
8. a light source (a linear light source)
9. reflectors
10. (reserve number)
11. a light control sheet
12. prism array
13. a diffuser (diffusing sheet)
14. a reflecting sheet
15. major axis for a surface-roughened protrusion
16. minor axis for a surface-roughened protrusion
17. the optical vectors of emitting light
18. tangential line for net dot
19. straight line for net dot
20. distance of neighboring net dots
21. the light scatter-enhanced region
22. the dark region
23. the base angle of light scatter-enhanced region
24. relatively steep region
25. relatively slant region
26. the light scatter-enhanced region
27. roughened surface
28.
29.
30. frame
31. liquid crystal display device As used herein, words such as close or in proximity include both in contact with and no contact but within prescribed distances.

The claims appended hereto are incorporated within the body of the specification by reference.

What is claimed is:

1. A light guide pipe comprising:
   a light incident surface,
   a light emitting surface orthogonal to said light incident surface,
   a reflecting surface opposed to said light emitting surface; and
   a light extractor formed on at least a part of at least one of said light emitting surface and said reflecting surface, wherein
   said light extractor comprises a plurality of surface-roughened protrusions and/or concaves provided in at least one surface of said light guide pipe wherein said light guide pipe comprises a square shape and a scatter enhancing region in a triangular portion of said reflecting surface and/or light emitting surface having as base said light incident surface, said light emitting surface, or said light reflecting surface; and
   said scatter enhancing region being set from 1.2 to 2 times higher in density of roughened protrusions and/or roughened concaves compared to a light source unit in which said scatter enhancing region is not provided.

2. The light guide pipe according to claim 1, wherein each one of said surface-roughened protrusions and/or concaves has a major axis in a direction nearly perpendicular to a long axis of said light source.

3. The light guide pipe according to claim 1, wherein said surface roughened protrusions and concaves have an effective aspect ratio of 1.1 or greater wherein
   the effective aspect ratio, α, is determined within a coordinate system and a sampling region of 10 mm×10 mm by a line integral:

$$\alpha = \int |\cos\theta| \cdot d\bar{r} / \int |\sin\theta| \cdot d\bar{r}$$

for unit vectors in a tangential direction on a contour line of an entire protrusion roughened surface of a pattern existing in the sampling region wherein the angle θ is an angle given between the tangential line and a straight line representing a direction orthogonal to the light incident surface.

4. The light guide pipe according to claim 1, wherein said surface roughened protrusions protrude 1 μm to 50 μm from said surface.

5. The light guide pipe according to claim 1, wherein the roughened protrusions and/or concaves have a mean roughness in the protrusion roughened surface of from 0.2 to 20 μm.

6. The light guide pipe according to claim 1, wherein the area density of the roughened protrusions and/or roughened concaves is from 3 to 65%.

7. A planar light source unit comprising a light guide pipe according to claim 1 wherein the light guide pipe is in the interior of the planar light source unit.

8. A liquid crystal display device comprising a planar light source unit according to claim 7 wherein the planar light source unit is in the interior of the liquid crystal display device.

9. A planar light source unit, comprising:
a light guide pipe having:
a light incident surface,
a light emitting surface orthogonal to said light incident surface,
a reflecting surface opposed to said light emitting surface; and
a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe; and
a reflecting sheet provided close to said reflecting surface of said light guide pipe; wherein
said light extractor comprises a plurality of surface-roughened protrusions and/or concaves provided in at least one surface of said light guide pipe and each one of said surface-roughened protrusions and/or concaves has a major axis in a direction nearly perpendicular to a long axis of said light source;
said light guide pipe has square shape where a scatter enhancing region is provided in a triangular portion of said reflecting surface and/or light emitting surface having as a base said light incident surface, said light emitting surface, or said light reflecting surface; and
said scatter enhancing region being set from 1.2 to 2 times higher in density of roughened protrusions and/or roughened concaves compared to a light source unit in which said scatter enhancing region is not provided.

10. The planar light source unit according to claim 9, comprising a diffuser provided in proximity to a surface of said prism unit of said light control sheet.

11. The planar light source unit according to claim 10, wherein the diffuser is facing away from the surface of said prism unit.

12. The planar light source unit according to claim 10, wherein an array-formed light collecting element is provided on an opposite surface to a surface provided with said prism array of said light control sheet, and a lens constituting said array-formed light collecting element having a generating line intersecting perpendicularly with said light incident surface of said light guide pipe.

13. The planar light source unit according to claim 12, wherein said array-formed light collecting element comprises a corrugate lens or a convex-formed lenticular lens.

14. The planar light source unit according to claim 9, wherein said prism unit comprises a triangular prism.

15. The planar light source unit according to claim 14, wherein said triangular prism has a top vertex angle between 55 degrees and 60 degrees.

16. The planar light source unit according to claim 10, wherein said surface-roughened protrusions have an effective aspect ratio of 1.1 or greater wherein the effective aspect ratio, α, is determined within a coordinate system and a sampling region of 10 mm×10 mm by a line integral:

$$\alpha = \int |\cos \theta| \cdot d\vec{r} / \int |\sin \theta| \cdot d\vec{r}$$

for unit vectors in a tangential direction on a contour line of an entire protrusion roughened surface of a pattern existing in the sampling region wherein the angle θ is an angle given between the tangential line and a straight line representing a direction orthogonal to the light incident surface.

17. The planar light source unit according to claim 9, wherein said light extractor comprises roughened protrusions.

18. The planar light source unit according to claim 9, wherein said light extractor comprises roughened protrusions having a protruding amount of from 1 μm to 50 μm, and said reflecting sheet is a mirror-reflective sheet having a diffusion angle of 10 degree or less.

19. The planar light source of claim 9, wherein said major axis is within 10 degrees of perpendicular to said long axis of said light source.

20. A liquid crystal display device comprising a planar light source unit according to claim 9 wherein the planar light source unit is in the interior of the liquid crystal display device.

21. A planar light source unit, comprising:
a light guide pipe having:
a light incident surface,
a light emitting surface orthogonal to said light incident surface,
a reflecting surface opposed to said light emitting surface; and
a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe;
a reflecting sheet provided close to said reflecting surface of said light guide pipe; and
a diffuser provided in proximity to a surface of said prism unit of said light control sheet; wherein
said light extractor comprises a plurality of surface-roughened protrusions and/or concaves provided in at least one surface of said light guide pipe and each one of said surface-roughened protrusions and/or concaves have a major axis in a direction nearly perpendicular to a long axis of said light source;

said light guide pipe has square shape where a scatter enhancing region is provided in a triangular portion of said reflecting surface and/or light emitting surface having as a base said light incident surface, said light emitting surface, or said light reflecting surface; and said scatter enhancing region being set from 1.2 to 2 times higher in density of roughened protrusions and/or roughened concaves compared to a light source unit in which said scatter enhancing region is not provided.

22. The planar light source unit according to claim 21, wherein the diffuser is facing away from the surface of said prism unit.

23. The planar light source unit according to claim 21, wherein said light extractor comprises roughened protrusions.

24. The planar light source unit according to claim 21, wherein said light extractor comprises roughened protrusions having a protruding amount of from 1 μm to 50 μm, and said reflecting sheet is a mirror-reflective sheet having a diffusion angle of 10 degree or less.

25. The planar light source of claim 21, wherein said major axis is within 10 degrees of perpendicular to said long axis of said light source.

26. A liquid crystal display device comprising a planar light source unit according to claim 21 wherein the planar light source unit is in the interior of the liquid crystal display device.

27. A planar light source unit, comprising:

a light guide pipe having:
  a light incident surface,
  a light emitting surface orthogonal to said light incident surface,
  a reflecting surface opposed to said light emitting surface; and
a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe;
a reflecting sheet provided close to said reflecting surface of said light guide pipe; and
an array-formed light collecting element is provided on an opposite surface to a surface provided with said prism array of said light control sheet, and a lens constituting said array-formed light collecting element having a generating line intersecting perpendicularly with said light incident surface of said light guide pipe; wherein said light extractor comprises a plurality of surface-roughened protrusions and/or concaves provided in at least one surface of said light guide pipe and each one of said surface-roughened protrusions and/or concaves has a major axis in a direction nearly perpendicular to a long axis of said light source;

said light guide pipe has square shape where a scatter enhancing region is provided in a triangular portion of said reflecting surface and/or light emitting surface having as a said light incident surface, said light emitting surface, or said light reflecting surface; and said scatter enhancing region being set from 1.2 to 2 times higher in density of roughened protrusions and/or roughened concaves compared to a light source unit in which said scatter enhancing region is not provided.

28. The planar light source unit according to claim 27, wherein said light extractor comprises roughened protrusions.

29. The planar light source unit according to claim 27, wherein said light extractor comprises roughened protrusions having a protruding amount of from 1 μm to 50 μm, and said reflecting sheet is a mirror-reflective sheet having a diffusion angle of 10 degree or less.

30. The planar light source of claim 27, wherein said major axis is within 10 degrees of perpendicular to said long axis of said light source.

31. A liquid crystal display device comprising a planar light source unit according to claim 27 wherein the planar light source unit is in the interior of the liquid crystal display device.

32. A planar light source unit, comprising:

a light guide pipe having:
  a light incident surface,
  a light emitting surface orthogonal to said light incident surface,
  a reflecting surface opposed to said light emitting surface; and
  a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe;
a reflecting sheet provided close to said reflecting surface of said light guide pipe; and
an array-formed light collecting element is provided on an opposite surface to a surface provided with said prism array of said light control sheet, and a lens constituting said array-formed light collecting element having a generating line intersecting perpendicularly with said light incident surface of said light guide pipe; wherein said light extractor comprises a plurality of surface-roughened protrusions and/or concaves provided in at least one surface of said light guide pipe and each one of said surface-roughened protrusions and/or concaves has a major axis in a direction nearly perpendicular to a long axis of said light source;

said light guide pipe has square shape where a scatter enhancing region is provided in a triangular portion of said reflecting surface and/or light emitting having as a base said light incident surface, said light emitting surface, or said light reflecting surface;

said scatter enhancing region being set from 1.2 to 2 times higher in density of roughened protrusions and/or roughened concaves compared to a light source unit in which said scatter enhancing region is not provided; and said array-formed light collecting element comprises a corrugate lens or a convex-formed lenticular lens.

33. The planar light source unit according to claim 32, wherein said light extractor comprises roughened protrusions.

34. The planar light source unit according to claim 32, wherein said light extractor comprises roughened protrusions having a protruding amount of from 1 μm to 50 μm, and
said reflecting sheet is a mirror-reflective sheet having a diffusion angle of 10 degree or less.

35. The planar light source of claim 32, wherein said major axis is within 10 degrees of perpendicular to said long axis of said light source.

36. A liquid crystal display device comprising a planar light source unit according to claim 32 wherein
the planar light source unit is in the interior of the liquid crystal display device.

37. A planar light source unit, comprising:
a light guide pipe having:
a light incident surface,
a light emitting surface orthogonal to said light incident surface,
a reflecting surface opposed to said light emitting surface; and
a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe; and
a reflecting sheet provided close to said reflecting surface of said light guide pipe; wherein
said light extractor comprises a plurality of surface-roughened protrusions and/or concaves provided in at least one surface of said light guide pipe and each one of said surface-roughened protrusions and/or concaves has a major axis in a direction nearly perpendicular to a long axis of said light source;
said light guide pipe has square shape where a scatter enhancing region is provided in a triangular portion of said reflecting surface and/or light emitting surface having as a base said light incident surface, said light emitting surface, or said light reflecting surface;
said scatter enhancing region being set from 1.2 to 2 times higher in density of roughened protrusions and/or roughened concaves compared to a light source unit in which said scatter enhancing region is not provided; and
said prism unit comprises a triangular prism having a top vertex angle between 55 degrees and 60 degrees.

38. The planar light source unit according to claim 37, wherein said light extractor comprises roughened protrusions.

39. The planar light source unit according to claim 37, wherein said light extractor comprises roughened protrusions having a protruding amount of from 1 μm to 50 μm, and
said reflecting sheet is a mirror-reflective sheet having a diffusion angle of 10 degree or less.

40. The planar light source of claim 37, wherein said major axis is within 10 degrees of perpendicular to said long axis of said light source.

41. A liquid crystal display device comprising a planar light source unit according to claim 37 wherein
the planar light source unit is in the interior of the liquid crystal display device.

42. A planar light source unit, comprising:
a light guide pipe having:
a light incident surface,
a light emitting surface orthogonal to said light incident surface,
a reflecting surface opposed to said light emitting surface; and
a light extractor formed on at least a part of at least one of said light emitting surface and said reflecting surface;
linear light sources arranged at opposite side ends of said light guide pipe;
a light control sheet provided in proximity to said light emitting surface of said light guide pipe and having a prism unit directed toward said light emitting surface of said light guide pipe; and
a reflecting sheet provided close to said reflecting surface of said light guide pipe; wherein
said light extractor comprises a plurality of surface-roughened protrusions and/or concaves provided in at least one surface of said light guide pipe and each one of said surface-roughened protrusions and/or concaves has a major axis in a direction nearly perpendicular to a long axis of said light source;
said light guide pipe has square shape where a scatter enhancing region is provided in a triangular portion of said reflecting surface and/or light emitting surface having as a base said light incident surface, said light emitting surface, or said light reflecting surface;
said scatter enhancing region being set from 1.2 to 2 times higher in density of roughened protrusions and/or roughened concaves compared to a light source unit in which said scatter enhancing region is not provided; and
said surface-roughened protrusions have an effective ratio of 1.1 or greater wherein
the effective aspect ratio, α, is determined within a coordinate system and a sampling region of 10 mm×10 mm by a line integral:

$$\alpha = \int |\cos\theta| \cdot d\bar{r} / \int |\sin\theta| \cdot d\bar{r}$$

for unit vectors in a tangential direction on a contour line of an entire protrusion roughened surface of a pattern existing in the sampling region wherein
the angle θ is an angle given between the tangential line and a straight line representing a direction orthogonal to the light incident surface.

43. The planar light source unit according to claim 42, wherein said light extractor comprises roughened protrusions.

44. The planar light source unit according to claim 42, wherein said light extractor comprises roughened protrusions having a protruding amount of from 1 μm to 50 μm, and
said reflecting sheet is a mirror-reflective sheet having a diffusion angle of 10 degree or less.

45. The planar light source of claim 42, wherein said major axis is within 10 degrees of perpendicular to said long axis of said light source.

46. A liquid crystal display device comprising a planar light source unit according to claim 42 wherein
the planar light source unit is in the interior of the liquid crystal display device.

47. A planar light source unit, comprising:
- a light guide pipe having:
  - a light incident surface,
  - a light emitting surface orthogonal to said light incident surface,
  - a reflecting surface opposed to said light emitting surface; and
  - a light extractor formed on at least a part of at least one of said light emitting surface and said reflecting surface;
- linear light sources arranged at opposite side ends of said light guide pipe;
- a light control sheet provided in proximity to said light emitting surface of said light guide pipe and having a prism unit directed toward said light emitting surface of said light guide pipe; and
- a reflecting sheet is a mirror-reflective sheet having a diffusion angle of 10 degree or less and said reflecting sheet is provided close to said reflecting surface of said light guide pipe; wherein
  - said light extractor comprises a plurality of surface-roughened protrusions having a protruding amount of from 1 $\mu$m to 50 $\mu$m and/or concaves provided in at least one surface of said light guide pipe and each one of said surface-roughened protrusions and/or concaves has a major axis in a direction nearly perpendicular to a long axis of said light source;
  - said light guide pipe has square shape where a scatter enhancing region is provided in a triangular portion of said reflecting surface and/or light emitting surface having as a base said light incident surface, said light emitting surface, or said light reflecting surface;
  - said scatter enhancing region being set from 1.2 to 2 times higher in density of roughened protrusions and/or roughened concaves compared to a light source unit in which said scatter enhancing region is not provided; and
  - said surface-roughened protrusions have an effective ratio of 1.1 or greater wherein
- the effective aspect ratio, $\alpha$, is determined within a coordinate system and a sampling region of 10 mm×10 mm by a line integral:

$$\alpha = \int |\cos \theta| \cdot d\vec{r} / \int |\sin \theta| \cdot d\vec{r}$$

for unit vectors in a tangential direction on a contour line of an entire protrusion roughened surface of a pattern existing in the sampling region wherein
- the angle $\theta$ is an angle given between the tangential line and a straight line representing a direction orthogonal to the light incident surface.

48. The planar light source unit according to claim 47, wherein said light extractor comprises roughened protrusions.

49. The planar light source of claim 47, wherein said major axis is within 10 degrees of perpendicular to said long axis of said light source.

50. A liquid crystal display device comprising a planar light source unit according to claim 47 wherein
- the planar light source unit is in the interior of the liquid crystal display device.

51. A planar light source unit, comprising:
- a light guide pipe having a light incident surface,
- one light emitting surface orthogonal to said light incident surface,
- a reflecting surface opposed to said light emitting surface and a light extractor formed on at least one of said light emitting surface and said reflecting surface;
- two light sources arranged at opposite side ends of said light guide pipe;
- a light control sheet provided in proximity to said light emitting surface of said light guide pipe and having a prism array comprising triangular prisms, and arranged such that said triangular prisms have a top vertex directed toward said light emitting surface of said light guide pipe and an arbitrary prism constituting said prism array has a generating line positioned generally in parallel with said light incident surface; and
- a reflecting sheet provided in proximity to said reflecting surface of said light guide pipe, wherein
  - said light extractor comprises a plurality of roughened protrusions and/or roughened concaves provided in at least one surface of said light guide pipe and each one of said surface-roughened protrusions has a major axis in a direction perpendicular or nearly perpendicular to said light source;
  - said light guide pipe has square shape;
  - said light guide pipe has a scatter-enhancing region provided in a triangular portion of said reflecting surface and/or said light emitting surface having as a base said light incident surface, said light emitting surface, or said light reflecting surface;
  - said scatter enhancing region being set higher in density of surface-roughened protrusions as compared to a case where said scatter enhancing region is not provided;
  - said reflecting sheet being a positive-reflective sheet having a diffusion angle of 10 degrees or less;
  - when any one of said light sources is put on, a view angle distribution characteristic of an emission light ray observed immediately above said light control sheet in a normal line direction of said light emitting surface represented as having a luminance in units of cd/m$^2$ taken on a vertical axis and an emitting angle of an emission light ray on a horizontal axis, a light emitting distribution characteristic of each emission light ray in a normal direction of said light emitting surface having relatively steep and relatively slant regions with a peak as a boundary; and
  - where both said two light sources are put on, view angle distribution characteristics given respectively by said light sources intersecting at their slant regions.

* * * * *